US012726301B2

(12) United States Patent
Futaki

(10) Patent No.: US 12,726,301 B2
(45) **Date of Patent: *Sep. 1, 2026**

(54) RADIO TERMINAL, RADIO ACCESS NETWOR NODE, AND METHOD THEREFOR

(71) Applicant: NEC Corporation, Tokyo (JP)

(72) Inventor: Hisashi Futaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/612,312

(22) Filed: Mar. 21, 2024

(65) Prior Publication Data

US 2024/0235756 A1 Jul. 11, 2024

Related U.S. Application Data

(63) Continuation of application No. 16/276,777, filed on Feb. 15, 2019, now abandoned, which is a (Continued)

(30) Foreign Application Priority Data

Nov. 13, 2017 (JP) ................................ 2017-218039

(51) Int. Cl.
*H04L 5/00* (2006.01)
*H04L 1/06* (2006.01)
(Continued)

(52) U.S. Cl.
CPC .......... *H04L 5/0046* (2013.01); *H04L 1/0693* (2013.01); *H04L 5/0039* (2013.01);
(Continued)

(58) Field of Classification Search
CPC ... H04L 5/0046; H04L 5/0053; H04L 5/0092; H04L 5/005; H04L 5/0039; H04L 1/0693;
(Continued)

(56) References Cited

U.S. PATENT DOCUMENTS 9,515,771 B2 12/2016 Venkob et al.
2013/0059610 A1* 3/2013 Siomina ................ H04W 24/10 455/456.6
(Continued)

FOREIGN PATENT DOCUMENTS

CN 102291731 A 12/2011
KR 10-2019-0036160 A 4/2019
(Continued)

OTHER PUBLICATIONS

Translation of WO-2019029365-A1 (Year: 2020).*
(Continued)

*Primary Examiner* — Pao Sinkantarakorn
(74) *Attorney, Agent, or Firm* — Sughrue Mion, PLLC

(57) ABSTRACT

A radio terminal (12) transmits, to a radio access network (RAN) node (11) in a radio access network (RAN), an indication indicating whether a measurement gap for inter-bandwidth part (BWP) measurement among BWPs included in a plurality of downlink BWPs is required. The downlink BWPs are included within one system bandwidth. Further, the radio terminal (12) receives, from the RAN node (11), a measurement configuration including a measurement gap configuration for one or more BWPs included in the downlink BWPs. It is thus, for example, possible to allow a radio terminal to be configured with a proper measurement gap for inter-BWP measurement within one carrier bandwidth.

11 Claims, 15 Drawing Sheets

Related U.S. Application Data continuation of application No. PCT/JP2018/030311, filed on Aug. 14, 2018.

(51) Int. Cl.

| | |
|---|---|
| ***H04W 24/10*** | (2009.01) |
| ***H04W 36/16*** | (2009.01) |
| ***H04W 72/0453*** | (2023.01) |
| ***H04W 76/27*** | (2018.01) |
| *H04W 36/06* | (2009.01) |
| *H04W 48/12* | (2009.01) |

(52) U.S. Cl.

CPC ............ *H04L 5/005* (2013.01); *H04L 5/0053* (2013.01); *H04L 5/0092* (2013.01); *H04W 24/10* (2013.01); *H04W 36/165* (2013.01); *H04W 72/0453* (2013.01); *H04W 76/27* (2018.02); *H04W 36/06* (2013.01); *H04W 48/12* (2013.01)

(58) Field of Classification Search

CPC . H04W 24/10; H04W 72/0453; H04W 76/27; H04W 36/165; H04W 48/12; H04W 36/06; H04W 36/0088

See application file for complete search history.

(56) References Cited

U.S. PATENT DOCUMENTS

| | | | | |
|---|---|---|---|---|
| 2013/0235755 | A1* | 9/2013 | Lucky | H04W 72/12<br>370/252 |
| 2017/0063703 | A1 | 3/2017 | Mani et al. | |
| 2017/0230780 | A1 | 8/2017 | Chincholi et al. | |
| 2018/0338253 | A1* | 11/2018 | Nagaraja | H04L 5/001 |
| 2019/0044689 | A1* | 2/2019 | Yiu | H04L 5/0091 |
| 2019/0045571 | A1* | 2/2019 | Wu | H04W 76/15 |
| 2019/0075585 | A1* | 3/2019 | Deogun | H04W 72/1268 |
| 2019/0124533 | A1* | 4/2019 | Tenny | H04L 5/0091 |
| 2019/0132862 | A1* | 5/2019 | Jeon | H04L 5/0064 |
| 2019/0182862 | A1 | 6/2019 | Jeon et al. | |
| 2019/0364602 | A1* | 11/2019 | Yi | H04W 74/0833 |
| 2020/0053583 | A1 | 2/2020 | Määttänen et al. | |
| 2020/0137605 | A1* | 4/2020 | Liu | H04W 36/14 |
| 2020/0169368 | A1 | 5/2020 | Tiirola et al. | |
| 2020/0288337 | A1* | 9/2020 | Callender | H04W 24/10 |
| 2020/0313832 | A1* | 10/2020 | Kim | H04W 72/23 |
| 2021/0410024 | A1 | 12/2021 | Tang et al. | |
| 2022/0255702 | A1 | 8/2022 | Tiirola et al. | |

FOREIGN PATENT DOCUMENTS

| | | | | |
|---|---|---|---|---|
| RU | 2581037 | C2 | 4/2016 | |
| WO | WO-2008085952 | A1 * | 7/2008 | H04W 36/0058 |
| WO | 2016/164782 | A1 | 10/2016 | |
| WO | 2016/187066 | A1 | 11/2016 | |
| WO | 2017/052596 | A1 | 3/2017 | |
| WO | 2017/078862 | A1 | 5/2017 | |
| WO | 2017/118687 | A1 | 7/2017 | |
| WO | WO-2019029365 | A1 * | 2/2019 | H04W 76/18 |
| WO | 2019/050323 | A1 | 3/2019 | |

OTHER PUBLICATIONS

R2-1711595, Samsung, "The Impact of Bandwidth Part on RAN2: Overview and Issues", 3GPP TSG RAN WG2 #99bis, Oct. 9-13, 2017.

R1-1717932, LG Electronics, "Remaining details on L3 measurement and mobility management", 3GPP TSG RAN WG1 Meeting #90bis, Oct. 9-13, 2017.

Ericsson, "On bandwidth parts and "RF" requirements", 3GPP TSG RAN1 NR Ad-Hoc#2, R1-1711795, Qingdao, P.R. China, Jun. 27-30, 2017, Agenda Item: 5.1.7, 9 pages total.

"LS on multiple SSBs within a wideband carrier", 3GPP TSG RAN WG2#99bis. R2-1709861, Aug. 21-25, 2017, Berlin, Germany, 1 page.

"LS on Furthur agreements for Bandwidth part operation," 3GPP TSG RAN WG2#99bis. R2-1710012, Oct. 9-13, 2017, Prague, Czech Republic, 2 pages total.

"Reply LS on multiple SSBs within a wideband carrier", 3GPP TSG RAN WG#99bis, R2-1710031, Oct. 9-13, 2017, Prague, Czech Republic, 1 page.

"LS on Bandwidth Part Operation in NR", 3GPP TSG RAN WG2#99. R2-1707624, Aug. 21-25, 2017, Berlin, Germany, 3 pages.

"LS on scenarios of multiple SSB", 3GPP TSG RAN WG2#99bis, R2-1710051, Prague, Czech Republic, Oct. 9-13, 2017, 2 pages total.

Samsung, "Framework to support bandwidth parts in NR", 3GPP TSG-RAN WG2 NR#99bis Meeting, R2-1711187, Oct. 9-13, 2017, Prague, Czech. 8 pages total.

Samsung, "RLM/RLF for bandwidth part", 3GPP TSG-RAN WG2 #99bis, R2-1711404, Oct. 9-13, 2017, Prague, Czech, 3 pages total.

ZTE Corporation et al., "Initial discussion on the impacts of BWP on RAN2", 3GPP TSG-RAN WG2 Meeting #99bis, R2-1711640, Oct. 9-13, 2017, Prague, Czech Republic, 5 pages total.

Ericsson, "Text Proposal for L1 parametrs for 38.331", 3GPP TSG-RAN WG2 #99bis, R2-1711969, Oct. 9-13, 2017, Prague, Czech Republic, 27 pages total.

ZTE, "Discussion on Intra frequency and Inter frequency definition in NR", 3GPP TSG-RAN WG4 Meeting RAN4#84, R4-1708192, Aug. 21-25, 2017, Berlin, Germany, 9 pages total.

International Search Report dated Oct. 23, 2018 issued by the International Searching Authority in international application No. PCT/JP2018/030311.

Office Action issued Aug. 24, 2020 in U.S. Appl. No. 16/796,413.

Extended European Search Report dated Nov. 27, 2020 from The European Patent office Application No. 18876350.

Mediatek Inc., "RRM Measurement for Bandwidth Part Operation", 3GPP TSG RAN WG2 Meeting #99, R2-1708001, Berlin, Germany, Aug. 21-25, 2017, 5 pages.

Intel Corporation, "Overall impact in RAN2 for BWP", 3GPP TSG RAN WG2 Meeting #99bis, R2-1710592, Prague, Czech Republic, Oct. 9-13, 2017, 8 pages.

Russian Office Action for RU Application No. 2020115628/07 mailed on Dec. 15, 2020 with English Translation.

U.S. Office Action for U.S. Appl. No. 16/796,413 mailed on Jun. 16, 2021.

Korean Office Action for KR Application No. 10-2020-7013024 mailed on Sep. 17, 2021 with English Translation.

Nokia et al., "On remaining aspects of BWPs", 3GPP TSG RAN WG1 #90bis, R1-1718607, Oct. 2, 2017.

Indian Office Communication for IN Application No. 202018041790 mailed on Nov. 23, 2021.

Korean Office Communication for KR Application No. 10-2020-7013024 mailed on Jul. 13, 2022 with English Translation.

R1-1717813, CATT, "Consideration on beam failure recovery", Oct. 9-13, 2017.

R2-1710965, vivo, "Discussion on bandwidth part operation", Oct. 9-13, 2017.

R4-1710670, MediaTek Inc., "The needs of Measurement Gap in NR", Oct. 9-13, 2017.

KR Office Action for KR Application No. 10-2022-7034660, mailed on Dec. 28, 2022 with English Translation.

Samsung, "Signaling to support bandwidth part", 3GPP TSG RAN WG2 #99bis, R2-1711188, Oct. 9-13, 2017, pp. 1-7.

Nokia et al., "Discussion on measurement gaps for NR", 3GPP TSG RAN WG4 #84, R4-1707459, Aug. 21-25, 2017, pp. 1-4.

KR Office Communication for KR Application No. 10-2022-7034660, mailed on Jan. 29, 2024 with English Translation.

Intel Corporation, Remaining aspects for carrier aggregation and bandwidth parts, 3GPP TSG RAN WG1 #AH, R1-1716327, Sep. 12, 2017.

LG Electronics, Further remaining details on wider bandwidth operation, 3GPP TSG RAN WG1 Meeting #90, R1-1713204, Aug. 21-25, 2017.

(56) References Cited

OTHER PUBLICATIONS

MediaTek Inc., Summary of Bandwidth Part Operations, 3GPP TSG RAN WG1 Meeting 90bis, R1-1718901, Oct. 9-13, 2017.
OPPO, Measurement Gap Configuration in MR-DC, 3GPP TSG-RAN2#99, R2-1707759, Aug. 21-25, 2017.
Samsung, Scenarios of Measurement Gap Considering Bandwidth Part, 3GPP TSG RAN WG2 #99bis, R2-1711607, Oct. 9-13, 2017.
Ericsson, On Bandwidth Parts and Multiple SSBs, 3GPP TSG-RAN WG2 #99bis, R2-1711822, Oct. 9-13, 2017.
LG Electronics, Discussion on carrier aggregation and bandwidth parts, 3GPP TSG RAN WG1 Meeting NR#3, R1-1715892, Sep. 18-21, 2017.
Convida Wireless, Discussion on BWP Design, 3GPP TSG RAN WG1 Meeting NR#3, R1-1716647, Sep. 18-21, 2017.
JP Office Action for JP Application No. 2023-110656, mailed on Sep. 17, 2024 with English Translation.
Extended European Search Report for EP Application No. 24184054.5, dated on Oct. 1, 2024.
AT&T, "SS block transmissions in a wideband CC", 3GPP Draft; R1-1712696, Aug. 21-25, 2017.
Chinese Office Action for CN Application No. 202310404385.7, mailed on Jun. 27, 2026 with English Translation.
Qualcomm Incorporated, "Considerations on CC and BWP in NR," R2-1711364 TSG-RAN WG2 Meeting #bis Oct. 9-13, 2017.
Wu Xing-fen, Song Rong-fang, "Performance Comparison of Multi-Beam Opportunistic Beamforming System," Journal of Nanjing University of Posts and Telecommunications (Natural Science), vol. 28, No. 6, Dec. 15, 2008.

* cited by examiner

| ACTIVE BWP | MEASUREMENT GAP | NO MEASUREMENT GAP |
|---|---|---|
| BWP #1 | BWP #2 | BWP #3 |
| BWP #2 | BWP #1 | BWP #3 |
| BWP #3 | - | BWP #1, #2 |

Fig. 14A

| ACTIVE BWP | MEASUREMENT GAP | NO MEASUREMENT GAP |
|---|---|---|
| BWP #1 | BWP #2 | BWP #3 |
| BWP #2 | BWP #1 | BWP #3 |
| BWP #3 | - | BWP #1, #2 |

Fig. 14B

| ACTIVE BWP | MEASUREMENT GAP | NO MEASUREMENT GAP |
|---|---|---|
| BWP #1 | - | BWP #2, #3 |
| BWP #2 | BWP #3 | BWP #1 |
| BWP #3 | BWP #2 | BWP #1 |

Fig. 14C

| BWP PAIR | NEED FOR MEASUREMENT GAP |
| --- | --- |
| BWP #1 AND #2 | NEEDED |
| BWP #1 AND #3 | NOT NEEDED |
| BWP #2 AND #3 | NOT NEEDED |

Fig. 15A

| BWP PAIR | NEED FOR MEASUREMENT GAP |
| --- | --- |
| BWP #1 AND #2 | NEEDED |
| BWP #1 AND #3 | NOT NEEDED |
| BWP #2 AND #3 | NOT NEEDED |

Fig. 15B

| BWP PAIR | NEED FOR MEASUREMENT GAP |
| --- | --- |
| BWP #1 AND #2 | NOT NEEDED |
| BWP #1 AND #3 | NOT NEEDED |
| BWP #2 AND #3 | NEEDED |

Fig. 15C

RADIO TERMINAL, RADIO ACCESS NETWOR NODE, AND METHOD THEREFOR

CROSS-REFERENCE TO RELATED APPLICATIONS

This application is a Continuation of U.S. application Ser. No. 16/276,777 filed on Feb. 15, 2019, which is a continuation application of International Application No. PCT/JP2018/030311 filed on Aug. 14, 2018, which claims the benefit of priority from Japanese Patent Application No. 2017-218039 filed on Nov. 13, 2017, the disclosures of each of which are incorporated herein by reference.

TECHNICAL FIELD

The present disclosure relates to a radio communication system and, in particular, to a radio communication system using one or more bandwidth parts configured within one carrier bandwidth.

BACKGROUND ART

The 3rd Generation Partnership Project (3GPP) has been working on the standardization for the fifth generation mobile communication system (5G) to make 5G a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN or 5GC) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS.

In contrast, with regard to the 5G System, it is discussed that although radio bearers may be used in the NG RAN, no bearers are used in the 5GC or in the interface between the 5GC and the NG-RAN. Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. Association between a 5G UE and a data network is referred to as a "PDU session". The term "PDU session" corresponds to the term "PDN connection" in LTE and LTE-Advanced. A plurality of PDU flows can be configured in one PDU session. The 3GPP specifications define a 5G QoS Indicator (5QI) corresponding to the QCI of the LTE for the 5G system.

The PDU flow is also referred to as a "QoS flow". The QoS flow is the finest granularity in QoS treatment in the 5G system. User plane traffic having the same N3 marking value in a PDU session corresponds to a QoS flow. The N3 marking corresponds to the above-described PDU flow ID, and it is also referred to as a QoS flow Identity (QFI) or a Flow Identification Indicator (FII). There is one-to-one relationship (i.e., one-to-one mapping) at least between each 5QI defined in the specification and a corresponding QFI having the same value (or number) as this 5QI.

FIG. 1 shows a basic architecture of the 5G system. A UE establishes one or more Signalling Radio Bearers (SRBs) and one or more Data Radio Bearers (DRBs) with a gNB. The 5GC and the gNB establish a control plane interface and a user plane interface for the UE. The control plane interface between the 5GC and the gNB (i.e., RAN) is referred to as an N2 interface, an NG2 interface or an NG-c interface, and is used for transfer of Non-Access Stratum (NAS) information and for transfer of control information (e.g., N2 AP Information Element) between the 5GC and the gNB. The user plane interface between the 5GC and the gNB (i.e., RAN) is referred to as an N3 interface, an NG3 interface or an NG-u interface, and is used for transfer of packets of one or more PDU flows in a PDU session of the UE.

Note that, the architecture shown in FIG. 1 is merely one of the 5G architecture options (or deployment scenarios). The architecture shown in FIG. 1 is referred to as "Standalone NR (in NextGen System)" or "Option 2". The 3GPP further discusses network architectures for multi-connectivity operations using the E-UTRA and NR radio access technologies. A representative example of the multi-connectivity operations is Dual Connectivity (DC) in which one Master node (MN) and one Secondary node (SN) cooperate with each other and simultaneously communicate with one UE. The Dual Connectivity operation using the E-UTRA and NR radio access technologies is referred to as Multi-RAT Dual Connectivity (MR-DC). The MR-DC is dual connectivity between E-UTRA and NR nodes.

In the MR-DC, one of the E-UTRA node (i.e., eNB) and the NR node (i.e., gNB) operates as a Master node (MN), while the other one operates as a Secondary node (SN), and at least the MN is connected to the core network. The MN provides one or more Master Cell Group (MCG) cells to the UE, while the SN provides one or more Secondary Cell Group (SCG) cells to the UE. The MR-DC includes "MR-DC with the EPC" and "MR-DC with the 5GC".

The MR-DC with the EPC includes E-UTRA-NR Dual Connectivity (EN-DC). In the EN-DC, the UE is connected to an eNB operating as the MN and a gNB operating as the SN. Further, the eNB (i.e., Master eNB) is connected to the EPC, while the gNB (i.e. Secondary gNB) is connected to the Master eNB through the X2 interface.

The MR-DC with the 5GC includes NR-E-UTRA Dual Connectivity (NE-DC) and NG-RAN E-UTRA-NR Dual Connectivity (NG-EN-DC). In the NE-DC, the UE is connected to a gNB operating as the MN and an eNB operating as the SN, the gNB (i.e., Master gNB) is connected to the 5GC, and the eNB (i.e. Secondary eNB) is connected to the Master gNB through the Xn interface. On the other hand, in the NG-EN-DC, the UE is connected to an eNB operating as the MN and a gNB operating as the SN, and the eNB (i.e., Master eNB) is connected to the 5GC, and the gNB (i.e. Secondary gNB) is connected to the Master eNB through the Xn interface.

FIGS. 2, 3 and 4 show the network configurations of the above-described three DC types: EN-DC, NE-DC and NG-EN-DC, respectively. Note that, although the Secondary gNB (SgNB) in the EN-DC of FIG. 2 is also referred to as en-gNB, and the Secondary eNB (SeNB) in the NE-DC of FIG. 3 and the Master eNB (MeNB) in the NG-EN-DC of FIG. 4 are also referred to as ng-eNB, they are simply referred to as gNB or eNB in this specification. The 5G System further supports dual connectivity between two gNBs. In this specification, dual connectivity between two gNBs is referred to as NR-NR DC. FIG. 5 shows the network configuration of NR-NR DC.

The NR is expected to use different sets of radio parameters in multiple frequency bands. Each radio parameter set is referred to as "numerology". OFDM numerology for an Orthogonal Frequency Division Multiplexing (OFDM) system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on service requirements.

The UE and the NR gNB in the 5G system support aggregation of multiple NR carriers with different numerologies. The 3GPP discusses achievement of aggregation of multiple NR carriers (or NR cells) with different numerologies by lower layer aggregation, such as the existing LTE Carrier Aggregation (CA), or higher layer aggregation, such as the existing Dual Connectivity.

The 5G NR supports channel bandwidths wider than those of the LTE (e.g., 100s of MHz). One channel bandwidth (i.e., a $BW_{Channel}$) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 500 MHz.

In order to effectively support multiple 5G services, such as wideband services like eMBB and narrow-bandwidth services like Internet of Things (IoT), it is preferable to multiplex these services onto a single channel bandwidth. Further, if every 5G UE needs to support transmission and reception in a transmission bandwidth corresponding to the entire channel bandwidth, this may hinder achievement of lower cost and lower power consumption of UEs for narrow-bandwidth IoT services. Thus, the 3GPP allows one or more bandwidth parts (BWPs) to be configured in the carrier bandwidth (i.e., channel bandwidth or system bandwidth) of each NR component carrier. Multiple BWPs in one NR channel bandwidth may be used for different frequency division multiplexing (FDM) schemes using different numerologies (e.g., subcarrier spacing (SCS)). The bandwidth part is also referred to as carrier bandwidth part.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not include a SS/PBCH block (SSB). A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SSB to be accessed by a UE is configured by higher layer signaling. The reference point "PRB 0" is common to all the UEs that share the same wideband component carrier.

One SS/PBCH block includes primary signals necessary for an idle UE, such as NR synchronization signals (NR-SS) and an NR physical broadcast channel (NR-PBCH). The NR-SS is used by the UE for DL synchronization. A Reference Signal (RS) is transmitted in the SS/PBCH block to enable an idle UE to perform Radio Resource Management (RRM) measurement (e.g., RSRP measurement). This RS may be the NR-SS itself or may be an additional RS. The NR-PBCH broadcasts part of the minimum System Information (SI), for example a Master Information Block (MIB). The remaining minimum SI (RMSI) is transmitted on a Physical Downlink Shared Channel (PDSCH).

A network can transmit multiple SS/PBCH blocks within the channel bandwidth of one wideband component carrier. In other words, SS/PBCH blocks may be transmitted in a plurality of BWPs within the channel bandwidth. In a first scheme, all the SS/PBCH blocks within one broadband carrier are based on NR-SS (e.g., a primary SS (PSS) and a secondary SS (SSS)) corresponding to the same physical-layer cell identity. In a second scheme, different SS/PBCH blocks within one broadband carrier may be based on NR-SS corresponding to different physical-layer cell identities.

From a UE perspective, a cell is associated with one SS/PBCH block. Therefore, for UEs, each serving cell has a single associated SS/PBCH block in frequency domain. Note that, each serving cell is a primary cell (PCell) in carrier aggregation (CA) and dual connectivity (DC), a primary secondary cell (PSCell) in DC, or a secondary cell (SCell) in CA and DC. Such an SSB is referred to as a cell defining SS/PBCH block. The Cell defining SS/PBCH block has an associated RMSI. The Cell defining SS/PBCH block is used as the time reference or the timing reference of the serving cell. Further, the Cell defining SS/PBCH block is used for SS/PBCH block (SSB) based RRM Measurements. The Cell defining SS/PBCH block can be changed for the PCell/PSCell by "synchronous reconfiguration" (e.g., reconfiguration of radio resource configuration information using an RRC Reconfiguration procedure and not involving a handover), while it can be changed for SCells by "SCell release/add".

One or more BWP configurations for each component carrier are semi-statically signaled to the UE. To be specific, for each UE-specific serving cell, one or more DL BWPs and one or more UL BWPs can be configured for the UE via a dedicated RRC message. Further, each of the one or more BWPs configured for the UE can be activated and deactivated. Activation/deactivation of a BWP is determined not by an RRC layer but by a lower layer (e.g., Medium Access Control (MAC) layer or Physical (PHY) layer). The activated BWP is referred to as active BWP.

Switching of the active BWP may be performed, for example, by Downlink Control Information (DCI) (e.g., scheduling DCI) transmitted on a NR Physical Downlink Control Channel (PDCCH). In other words, deactivation of the current active BWP and activation of a new active BWP may be performed by the DCI in the NR PDCCH. Thus, the network can activate/deactivate a BWP depending, for example, on a data rate, or on numerology required by a service, and can thereby dynamically switch the active BWP for the UE. Activation/deactivation of the BWP may be performed by a MAC Control Element (CE).

FIGS. 6 and 7 show usage examples of BWPs. In the example shown in FIG. 6, the channel bandwidth of one component carrier is divided into BWP #1 and BWP #2, and these two BWPs are used for FDM schemes using different numerologies (e.g., different subcarrier spacing). In the example shown in FIG. 7, narrowband BWP #1 is set in a channel bandwidth of one component carrier and narrowband BWP #2 narrower than BWP #1 is further set within the BWP #1. When BWP #1 or BWP #2 is activated for the UE, this UE can reduce its power consumption by refraining from performing reception and transmission within the channel bandwidth except the active BWP.

Non Patent Literatures 1 to 7 disclose the above-described BWP and cell defining SS/PBCH block.

Further, the 3GPP discusses the requirements for Radio Link Monitoring (RLM) related to the use of BWPs (see Non Patent Literature 8). The RLM procedure is used by the UE in connected mode (i.e., RRC_CONNECTED) in order to measure downlink radio quality of the serving cell for the purpose of detecting out of synchronization (out-of-sync) and detecting Radio Link Failure (RLF).

Non Patent Literature 8 discloses the following matters. NR supports RLM in the PCell and the PSCell only. One or more BWPs can be configured per cell for a UE in connected mode semi-statically. The UE can switch a specific BWP for the communication with the gNB among the configured BWPs. This switching is carried out in shorter time scale, such as several scheduling intervals. This specific BWP is called the active BWP. The UE can only access one BWP at a time. The active BWP has at least a Channel State Information Reference Signal (CSI-RS) configured for RLM. A single RS type between CSI-RS and SS/PBCH block is configured to be monitored for RLM at a time. Even when different types of RS (i.e., CSI-RS and SS/PBCH block) are simultaneously configured in one BWP, only single RS is chosen for RLM and its related parameter is used for RLM. It is discussed that, when the DL active BWP is switched (or changed), the UE keeps on-going L3 parameters related to RLM. In this case, even when the DL active BWP is switched, the UE does not reset L3 parameters related to RLM to their default values.

Further, Non Patent Literature 9 discloses the following matters as to the case where the SS/PBCH block (SSB) is monitored for RRM measurements (i.e., SS/PBCH block (SSB) based RRM Measurements). The (SSB-based) Intra-frequency Measurement is defined as a measurement when the center frequency of the (cell defining) SSB of the serving cell and the center frequency of the (cell defining) SSB of the neighbor cell are the same and the subcarrier spacings of the two SSBs are also the same. On the other hand, the (SSB-based) inter-frequency measurement is defined as a measurement when the center frequency of the (cell defining) SSB of the serving cell and the center frequency of the (cell defining) SSB of the neighbor cell are different, or the subcarrier spacings of the two SSBs are different.

Further, the 3GPP discusses the necessity of measurement gaps in radio frequency (RF) measurements (see Non Patent Literature 10). Non Patent Literature 10 discloses that a UE performs a measurement outside of its active BWP during a measurement gap.

Note that, the 3GPP Release 14 and previous releases include the following regulations related to measurement gaps for inter-frequency measurements. According to the 3GPP Release 13 and previous releases, in the case of CA and DC, measurements in activated CCs are performed without measurement gaps. Whether or not measurement gaps are needed for Inter-frequency measurements and Inter-RAT measurements depends on UE capabilities (e.g., whether a UE has multiple receivers or not). UE capability signaling is used to notify the eNodeB of the necessity of measurement gaps for each supported and measured band.

Further, in the 3GPP Release 14, the eNB can configure per-CC (or per-serving cell) measurement gaps for a UE. The secondary cell (SCell) is activated or deactivated by a MAC Control Element (CE). Note that, however, the PCell and the PSCell are not changed by MAC CEs. In the situation where the PCell and the PSCell are not changed, the UE can measure other CCs different from the activated CC by using per-CC measurement gaps configured by a RRC Connection reconfiguration.

CITATION LIST

Non Patent Literature

Non Patent Literature 1:3GPP R1-1711795, Ericsson, "On bandwidth parts and "RF" requirements", TSG RAN1 NR Ad-Hoc #2, Qingdao, P. R. China, June 2017

Non Patent Literature 2:3GPP R2-1707624, "LS on Bandwidth Part Operation in NR", 3GPP TSG RAN WG2 #99, Berlin, Germany, August 2017

Non Patent Literature 3:3GPP R2-1710012, "LS on Further agreements for Bandwidth part operation", 3GPP TSG RAN WG2 #99bis, Prague, Czech Republic, October 2017

Non Patent Literature 4:3GPP R2-1710031, "Reply LS on multiple SSBs within a wideband carrier", 3GPP TSG RAN WG2 #99bis, Prague, Czech Republic, October 2017

Non Patent Literature 5:3GPP R2-1711640, ZTE Corporation, Sane Chips, "Initial discussion on the impacts of BWP on RAN2", 3GPP TSG-RAN WG2 Meeting #99bis, Prague, Czech Republic, October 2017 Non Patent Literature 6:3GPP R2-1711969, Ericsson, "Text Proposal for L1 parameters for 38.331", 3GPP TSG-RAN WG2 #99bis, Prague, Czech Republic, October 2017

Non Patent Literature 7:3GPP R2-1709861, "LS on multiple SSBs within a wideband carrier", 3GPP TSG RAN WG2 #99, Berlin, Germany, August 2017

Non Patent Literature 8:3GPP R2-1711404, Samsung, "RLM/RLF for bandwidth part", 3GPP TSG RAN WG2 #99bis, Prague, Czech Republic, October 2017

Non Patent Literature 9:3GPP R2-1710051, "LS on scenarios of multiple SSB", 3GPP TSG RAN WG2 #99bis, Prague, Czech Republic, October 2017

Non Patent Literature 10:3GPP R2-1711187, Samsung, "Framework to support bandwidth parts in NR", 3GPP TSG RAN WG2 #99bis, Prague, Czech Republic, October 2017

SUMMARY OF INVENTION

Technical Problem

The present inventor has conducted studies on RF measurement (e.g., RLM measurement and CSI measurement) when multiple BWPs are configured within a single channel bandwidth and found several problems. For example, consider a case where a UE in connected mode (e.g., NR RRC_CONNECTED) monitors, for RLM measurement and CSI measurement, another BWP belonging to the same component carrier bandwidth (i.e., the channel bandwidth) as its active BWP. In this case, whether or not a measurement gap is needed is considered to be dependent on UE Capabilities. However, there is a problem that, when one carrier bandwidth includes multiple BWPs, it is unclear how the UE and the gNB configure a measurement gap for inter-BWP measurement of those BWPs. One of the objects to be attained by embodiments disclosed herein is to provide an apparatus, a method, and a program that contribute to solving this problem. It should be noted that this object is merely one of the objects to be attained by the embodiments disclosed herein. Other objects or problems and novel features will be made apparent from the following description and the accompanying drawings.

Solution to Problem

In a first aspect, a radio terminal includes a memory and at least one processor coupled to the memory. The at least one processor is configured to transmit, to a radio access network (RAN) node in a radio access network (RAN), an indication indicating whether a measurement gap for inter-bandwidth part (BWP) measurement among BWPs included in a plurality of downlink BWPs is required. The downlink BWPs are included within one system bandwidth. The at least one processor is further configured to receive, from the RAN node, a measurement configuration including a measurement gap configuration for one or more BWPs included in the downlink BWPs.

In a second aspect, a radio access network (RAN) node includes a memory and at least one processor coupled to the memory. The at least one processor is configured to receive, from a radio terminal, an indication indicating whether a measurement gap for inter-bandwidth part (BWP) measurement among BWPs included in a plurality of downlink BWPs is required. The downlink BWPs are included within one system bandwidth. The at least one processor is further configured to transmit, to the radio terminal, a measurement configuration including a measurement gap configuration for one or more BWPs included in the downlink BWPs.

In a third aspect, a method for a radio terminal includes: transmitting, to a radio access network (RAN) node in a radio access network (RAN), an indication indicating whether a measurement gap for inter-bandwidth part (BWP) measurement among BWPs included in a plurality of downlink BWPs is required, the downlink BWPs being included within one system bandwidth; and receiving, from the RAN node, a measurement configuration including a measurement gap configuration for one or more BWPs included in the downlink BWPs.

In a fourth aspect, a method for a radio access network (RAN) node includes: receiving, from a radio terminal, an indication indicating whether a measurement gap for inter-bandwidth part (BWP) measurement among BWPs included in a plurality of downlink BWPs is required, the downlink BWPs being included within one system bandwidth; and transmitting, to the radio terminal, a measurement configuration including a measurement gap configuration for one or more BWPs included in the downlink BWPs.

In a fifth aspect, a program includes instructions (software codes) that, when loaded into a computer, cause the computer to perform the method according to the above-described third or fourth aspect.

Advantageous Effects of Invention

According to the above-deceived aspects, it is possible to provide an apparatus, a method, and a program that allow a radio terminal to be configured with a proper measurement gap for inter-BWP measurement within one carrier bandwidth.

BRIEF DESCRIPTION OF DRAWINGS

FIG. 14A is a diagram showing an example of signaling indicating necessity of measurement gaps;

FIG. 14B is a diagram showing an example of signaling indicating necessity of measurement gaps;

FIG. 14C is a diagram showing an example of signaling indicating necessity of measurement gaps;

FIG. 15A is a diagram showing an example of signaling indicating necessity of measurement gaps;

FIG. 15B is a diagram showing an example of signaling indicating necessity of measurement gaps;

FIG. 15C is a diagram showing an example of signaling indicating necessity of measurement gaps;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

Figure 1:
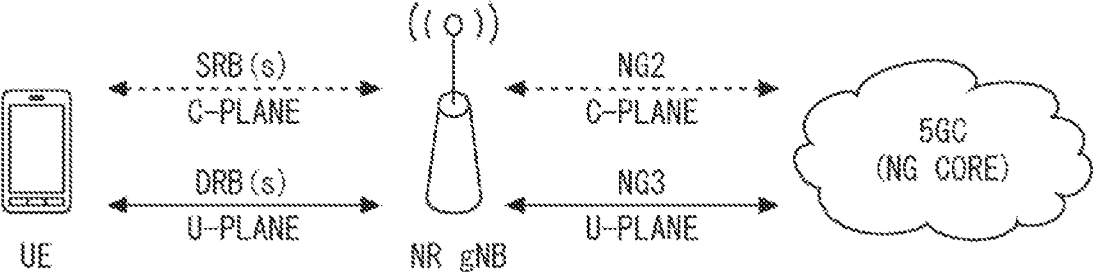
FIG. 1 is a diagram showing a basic architecture of a 5G System.
Figure 2:
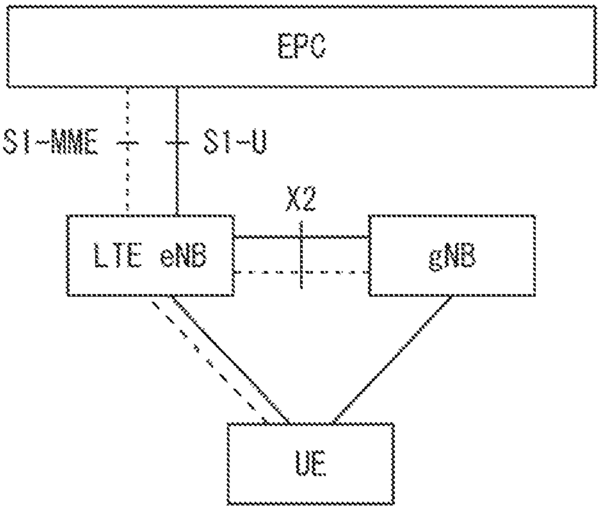
FIG. 2 is a diagram showing a network configuration of EN-DC.
Figure 3:
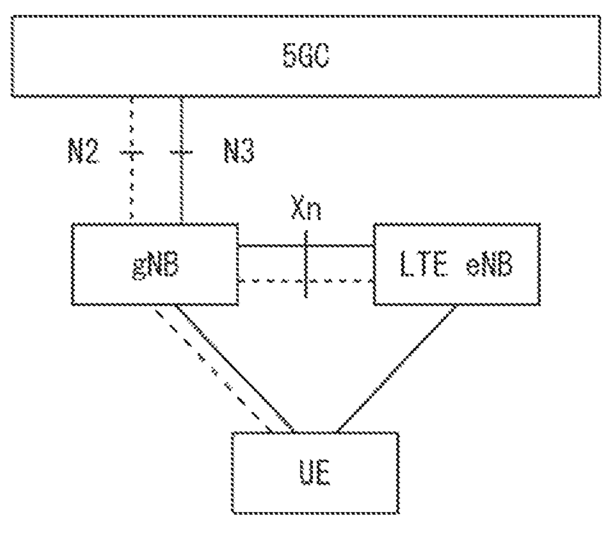
FIG. 3 is a diagram showing a network configuration of NE-DC.
Figure 4:
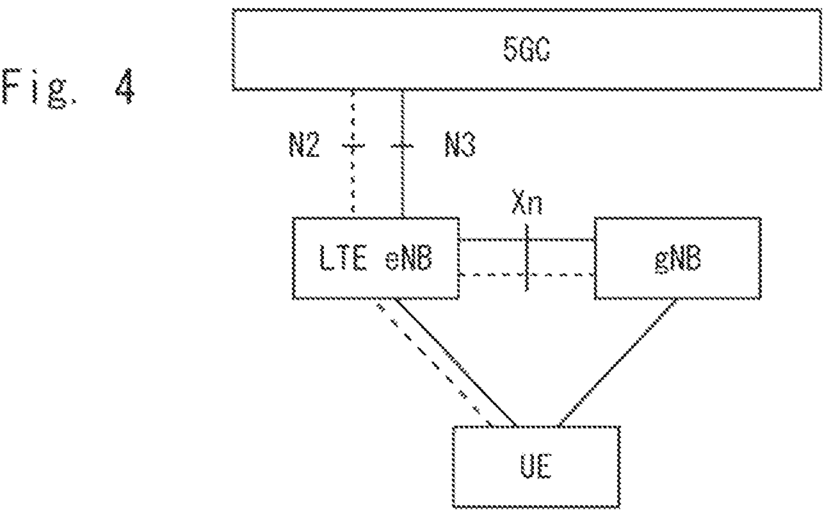
FIG. 4 is a diagram showing a network configuration of NG-EN-DC.
Figure 5:
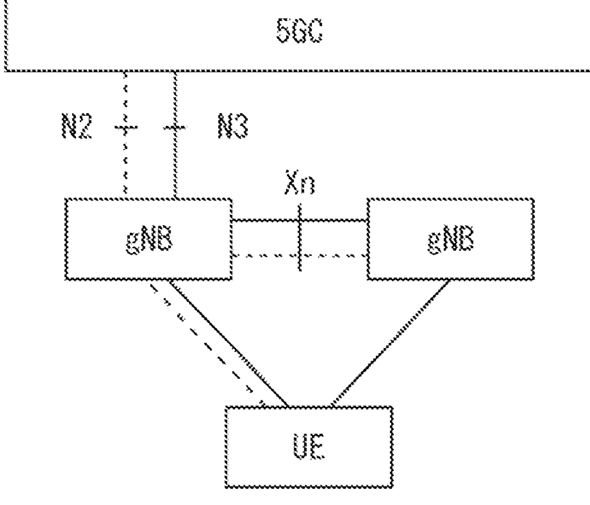
FIG. 5 is a diagram showing a network configuration of NR-NR DC.
Figure 6:
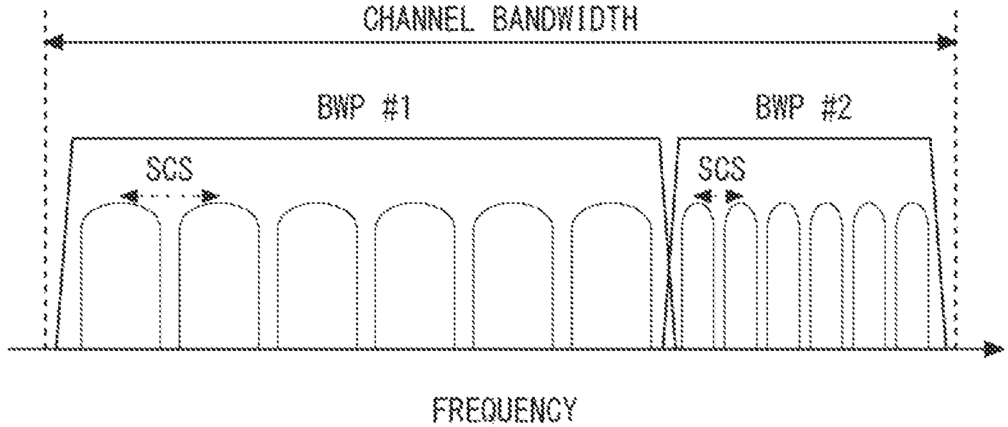
FIG. 6 is a diagram showing an example of use of Bandwidth parts (BWPs)
Figure 7:
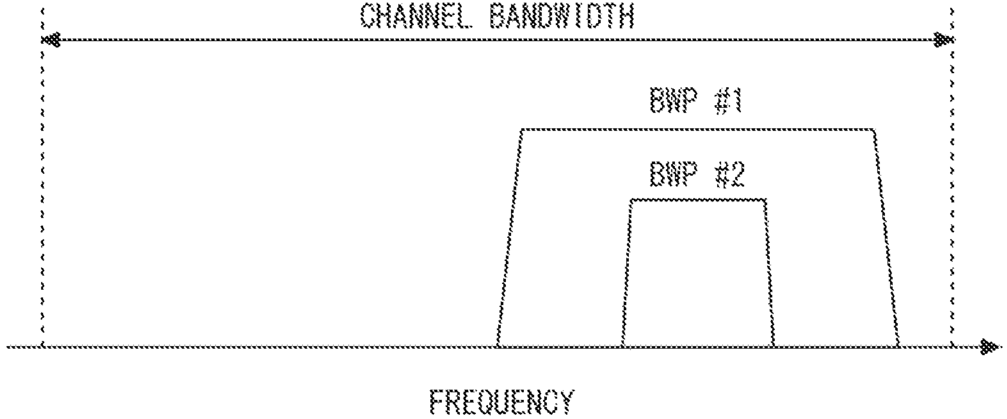
FIG. 7 is a diagram showing an example of use of Bandwidth parts (BWPs)
Figure 8:
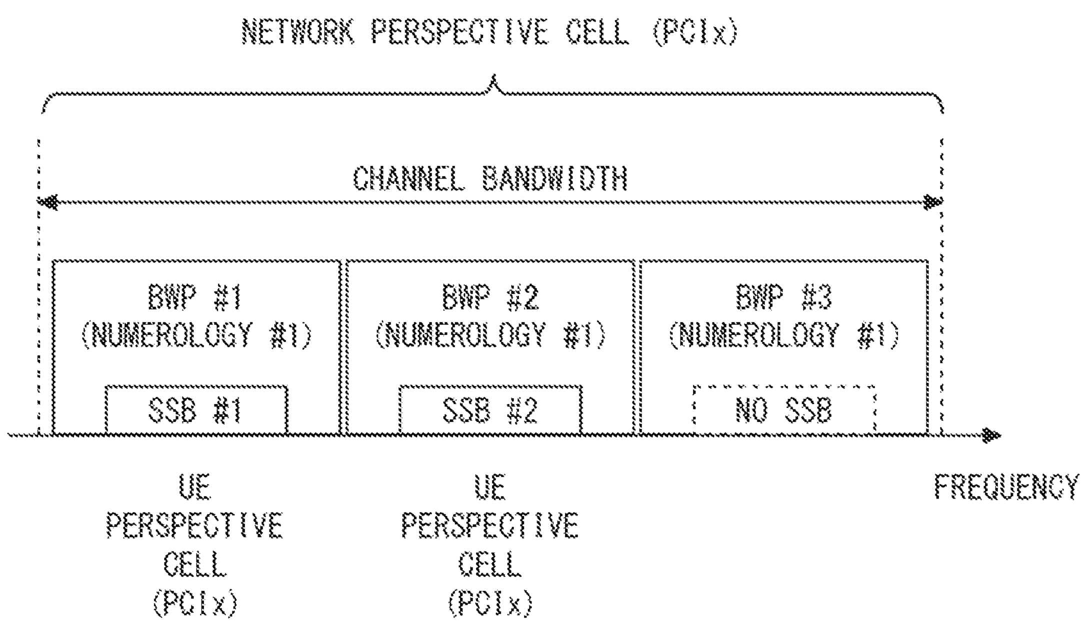
FIG. 8 is a diagram showing a configuration example of BWPs and SS/PBCH blocks.
Figure 9:
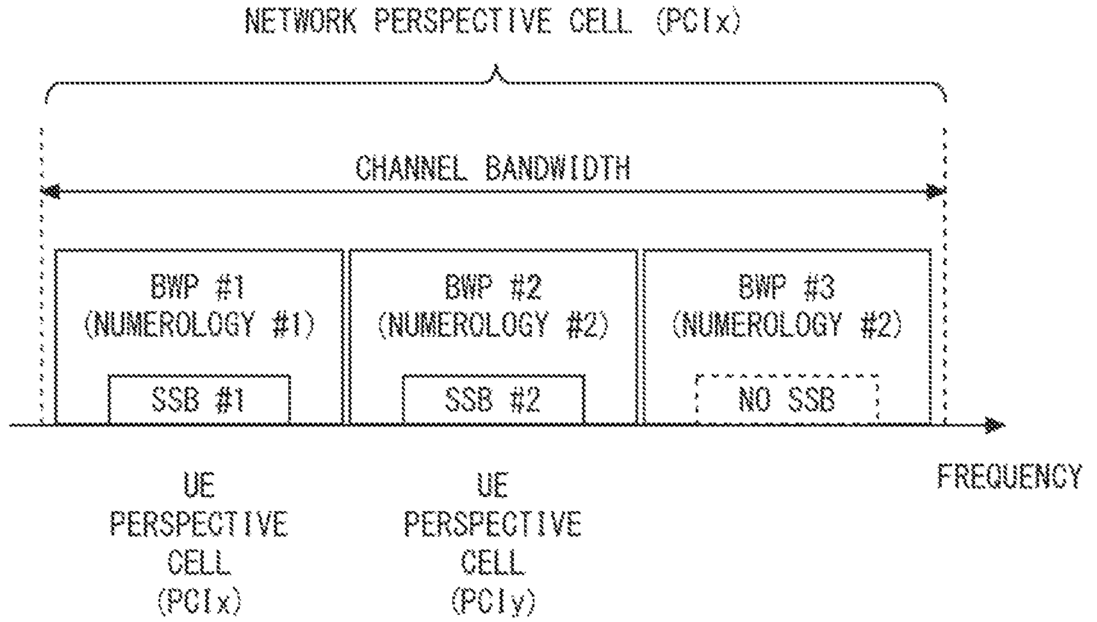
FIG. 9 is a diagram showing a configuration example of BWPs and SS/PBCH blocks.

First, the definition of terms used in cases where one system bandwidth includes multiple BWPs is described with reference to FIGS. 8 and 9. FIGS. 8 and 9 show configuration examples of BWPs and SS/PBCH blocks. In the examples shown in FIGS. 8 and 9, one channel bandwidth includes three BWPs: BWP #1, BWP #2 and BWP #3. BWP #1 and BWP #2 include SS/PBCH block (SSB) #1 and SSB #2, respectively, while BWP #3 does not include any SS/PBCH blocks.

From a network perspective, the entire bandwidth (i.e., channel bandwidth or system bandwidth) of one component carrier corresponds to one cell, just like in the existing LTE. In the examples of FIGS. 8 and 9, Physical Cell Identity (PCI) associated with a cell corresponding to the channel bandwidth is "PCIx".

In this specification, a cell from the network perspective is defined as a "logical cell." Further, a PCI associated with the cell from the network perspective (i.e., logical cell) is defined as a reference PCI. Note that, the cell from the network perspective (i.e., logical cell) may be associated with one Cell Identity. In this case, the Cell Identity of the cell from the network perspective (i.e., logical cell) may be associated with (sub-)PCIs of a plurality of physical cells, which are described later.

On the other hand, as described earlier, from a UE perspective, a cell is associated with one SS/PBCH block. In this specification, a cell from the UE perspective is defined as a "physical cell." Further, a PCI associated with the cell from the UE perspective (i.e., physical cell) is defined as a sub-PCI. Specifically, multiple BWPs that are included in the same system bandwidth and include their respective SS/PBCH blocks are multiple cells from the UE perspective (i.e., multiple physical cells). Sub-PCIs of these cells from the UE perspective (i.e., physical cells) are associated with one reference PCI or one Cell Identity of the cell from the network perspective (i.e., logical cell). Further, a BWP not including any SS/PBCH blocks may be defined as a cell from the UE perspective (i.e., physical cell), or a group of BWPs including a BWP without SS/PBCH block and a BWP with SS/PBCH block, which is referred to by the former one, may be defined as a cell from the UE perspective (i.e., physical cell). Note that, also in the network perspective, a unit system bandwidth that is actually used by the network (e.g., RAN node) for communication with the UE is each cell from the UE perspective (i.e., physical cell).

In the example of FIG. 8, the three BWPs support the same numerology (i.e., numerology #1), and all the SS/PBCH blocks (i.e., SSB #1 and SSB #2) within the channel bandwidth are based on NR-SS corresponding to the same (sub-)PCI (i.e., PCIx). Thus, FIG. 8 corresponds to the first scheme, which is described above in relation to transmission of multiple SS/PBCH blocks in one channel bandwidth. To synchronize with BWP #3 not including any SSBs, the UE monitors one of SSB #1 and SSB #2 transmitted in other BWPs. SSB #1 or SSB #2 to be monitored is referred to as a reference SSB, and the UE may receive a notification of the identifier of the reference SSB (SSB index, e.g., SSB #1 or #2) from the network.

In the example of FIG. 9, BWP #1 supports numerology #1, while BWP #2 and BWP #3 support numerology #2. Different SSBs #1 and #2 with different numerologies are based on NR-SSs corresponding to different (sub-)PCIs (i.e., PCIx and PCIy). Thus, FIG. 9 corresponds to the second scheme, which is described above in relation to transmission of multiple SS/PBCH blocks in one channel bandwidth. To synchronize with BWP #3 not including any SSBs, the UE monitors, for example, SSB #2 of BWP #2 that supports the same numerology as BWP #3. Alternatively, to synchronize with BWP #3 not including any SSBs, the UE may monitor SSB #1 of BWP #1 that supports numerology different from that of BWP #3.

In the example of FIG. 8, sub-PCIs (i.e., PCIx and PCIx) of two cells from the UE perspective (i.e., physical cells) are associated with the reference PCI (i.e., PCIx) or Cell Identity of one cell from the network perspective (i.e., logical cell). Meanwhile, in the example of FIG. 9, sub-PCIs (i.e., PCIx and PCIy) of two cells from the UE perspective (i.e., physical cells) are associated with the reference PCI (i.e., PCIx) or Cell Identity of one cell from the network perspective (i.e., logical cell).

The network (e.g., RAN node) may configure the UE with a BWP set including one or more BWPs. In other words, the UE receives, from the network, configuration information of one or more BWPs (e.g., SSB indexes, presence of SSBs, reference SSB indexes, Layer-1 parameters). The BWP set may be configured individually for each of downlink (DL) and uplink (UL). Thus, the BWP set may include a DL BWP set for DL and an UL BWP set for UL. Alternatively, an UL BWP and a DL BWP may be associated in advance with each other, and in this case the BWP set may be common to DL and UL. The UE can activate k (k<=K) BWPs among K BWPs included in the (DL/UL) BWP set. Stated differently, for certain UE, up to K (DL/UL) BWP(s) can be activated at a time. In the following description, it is assumed for the sake of simplification that one BWP (i.e. k=1) is activated. Note that, however, this embodiment and the subsequent embodiments are applicable also to the cases where two or more (k>=2) BWPs are activated at a time.

Further, in this specification, the term "BWP group" is employed. A BWP group is contained in a BWP set. One BWP group consists of one or more BWPs among which the active BWP can be changed by DCI transmitted on a NR PDCCH. Among one or more BWPs included in the same BWP group, the active BWP can be changed without change of the Cell defining SSB. Thus, the BWP group may be defined as one or more BWPs associated with the same cell defining SSB. One BWP group may include one BWP including the cell defining SSB (e.g., base BWP, initial BWP, or default BWP) and one or more other BWPs. Each of one or more other BWPs, which are not the base BWP (or initial BWP, default BWP), may or may not include a SSB. The UE may be explicitly informed (or may be configured as to) which SSB is the cell defining SSB. Alternatively, the UE may implicitly consider that the cell defining SSB is the SSB of the initial BWP when the UE has been configured with the BWP group.

The BWP group may be configured individually for each of downlink (DL) and uplink (UL). Thus, the BWP group may include a DL BWP group for DL and an UL BWP group for UL. Alternatively, an UL BWP and a DL BWP may be associated in advance with each other, and the BWP group in this case may be common to DL and UL.

In the example of FIG. 8, the UE is configured with one BWP set including BWP #1 to #3. In the example of FIG. 8, the UE may monitor SSB #1 transmitted in BWP #1 to synchronize with BWP #3 (i.e., to achieve synchronization in BWP #3). In this case, BWP #1 and BWP #3 may correspond to one BWP group, while BWP #2 may correspond to another one BWP group. Thus, one BWP set (BWPs #1, #2, and #3) may include a first BWP group (BWPs #1 and #3) and a second BWP group (BWP #2). Alternatively, one BWP set (BWPs #1, #2, and #3) may include a first BWP group (BWP #1) and a second BWP group (BWPs #2 and #3). Further alternatively, one BWP set (BWPs #1, #2, and #3) may correspond to one BWP group (BWPs #1, #2, and #3). In this case, one of SSB #1 and SSB #2 serves as the cell defining SSB for the UE.

In the example of FIG. 9 also, the UE is configured with one BWP set including BWP #1 to #3. In one example, BWP #1 with numerology #1 may correspond to one BWP group, while BWP #2 and BWP #3 with numerology #2 may correspond to another one BWP group. Thus, one BWP set (BWPs #1, #2, and #3) may include a first BWP group (BWP #1) and a second BWP group (BWPs #2 and #3). Note that, as described earlier, BWPs with different numerologies may be included in one BWP group. Thus, in another example, one BWP set (BWPs #1, #2, and #3) may include a first BWP group (BWPs #1 and #3) and a second BWP group (BWP #2). Further alternatively, one BWP set (BWPs #1, #2, and #3) may correspond to one BWP group (BWPs #1, #2, and #3). In this case, one of SSB #1 and SSB #2 serves as the cell defining SSB for the UE.

As described earlier, activation/deactivation of a BWP may be performed by a lower layer (e.g., Medium Access Control (MAC) layer, or Physical (PHY) layer), rather than by the RRC layer. A timer (e.g., BWP Inactivity Timer in the MAC layer) may be used for activation/deactivation of a DL BWP. The UE may switch the active BWP according to a timer based on a set value provided by the gNB. This timer may represent a period or duration in the unit of subframes. For example, when the UE transmit or receive no data for a predetermined period (i.e., expiration of the timer value) in the active BWP, it switches the active BWP to a predetermined BWP (e.g., default BWP, or BWP including the cell defining SSB). Such determination of the change of the active BWP based on the timer may be made also in the network (e.g., RAN node).

First Embodiment

Figure 10:
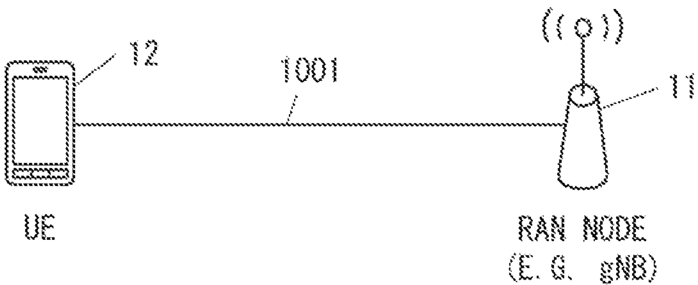
FIG. 10 is a diagram showing a configuration example of a radio communication network according to several embodiments.

FIG. 10 shows a configuration example of a radio communication network according to several embodiments including this embodiment. In the example of FIG. 10, the radio communication network includes a RAN node 11 and a radio terminal (UE) 12. The RAN node 11 is, for example, a gNB, or an eNB in MR-DC. The RAN node 11 may be a Central Unit (CU) (e.g., gNB-CU) or a Distributed Unit (DU) (e.g., gNB-DU) in the cloud RAN (C-RAN) deployment. The Central Unit (CU) is also referred to as a Baseband Unit (BBU) or a digital unit (DU). The Distributed Unit (DU) is also referred to as a Radio Unit (RU), a Remote Radio Head (RRH), a Remote Radio Equipment (RRE), or a Transmission and Reception Point (TRP or TRxP).

The UE 12 is connected to the RAN node 11 through an air interface 1001. The UE 12 may be simultaneously connected to a plurality of RAN nodes for dual connectivity. The UE 12 in connected mode can be semi-statically configured with one or more BWPs per cell. The UE 12 can switch its active BWP, used for communication with the RAN node 11 (e.g., MgNB) or another RAN node (e.g., SgNB), among the configured BWPs. This switching is done in a short time, e.g., several scheduling intervals.

The UE 12 performs an RLM procedure when it is in connected mode (e.g., NR RRC_CONNECTED). The UE 12 performs RLM measurement in the RLM procedure. Specifically, the UE 12 measures downlink radio quality of the serving cell for the purpose of detecting out of synchronization (out-of-sync) and detecting Radio Link Failure (RLF). The UE 12 may be simultaneously connected to a plurality of RAN nodes for dual connectivity. In this case, the UE 12 may perform RLM in the PCell and RLM in the PSCell simultaneously.

Further, the UE 12 may perform CSI measurement when it is in connected mode (e.g., NR RRC_CONNECTED). The CSI measurement includes, when the UE 12 is in connected mode (e.g., NR RRC_CONNECTED), measuring the DL radio quality of the serving cell for the purpose of transmitting to the RAN node 11 a report including Channel Quality Indicator (CQI) to be used for one or both of scheduling and link adaptation. The UE 12 may be simultaneously connected to a plurality of RAN nodes for dual connectivity. In this case, the UE 12 may simultaneously perform CSI measurement in the MCG and CSI measurement in the SCG.

Furthermore, the UE 12 may perform RRM measurement when it is in connected mode (e.g., NR RRC_CONNECTED). For example, in the RRM measurement in connected mode, the UE 12 measures the RSRP and RSRQ of the serving cell and those of the neighbor cell, and transmits to the RAN node 11 an RRM reporting event for triggering a handover.

Each BWP has at least CSI-RS that can be used for RLM measurement, RRM measurement and CSI measurement.

The active BWP may or may not contain an SS/PBCH block (SSB). Either type, i.e., CSI-RS or SS/PBCH block, is configured to be monitored for RLM at a time. Even when different types of RS (i.e., CSI-RS and SS/PBCH block) are simultaneously configured in one BWP, only one RS is selected for RLM, and accordingly parameters related to the selected RS are used for RLM.

The RAN node 11 provides a measurement configuration to the UE 12. This measurement configuration relates to RF measurement to be performed by the UE 12. The RF measurement includes at least one of RLM measurement, CSI measurement and RRM measurement. Thus, this measurement configuration includes at least one of an RLM measurement configuration, a CSI measurement configuration and an RRM measurement configuration.

The RLM measurement configuration may be referred to as an RLF-related configuration. The RLM measurement configuration includes, for example, parameters for RLM. The parameters for RLM include, for example, a specified number of out-of-sync, a specified number of in-sync, and an expiration period (or the maximum time) of an RLF timer. The specified number of out-of-sync is the number of consecutive “out-of-sync” indications received from lower layers before the UE starts the radio link self-recovery process. The specified number of in-sync is the number of consecutive “in-sync” indications received from lower layers before the UE determines that the radio link has recovered. The RLF timer is used to determine (or detect) RLF. The UE starts the RLF timer upon receiving the specified number of consecutive out-of-sync indications, and stops the RLF timer upon receiving the specified number of consecutive in-sync indications. The expiration period (or the maximum time) of the RLF timer is equivalent to the maximum time allowed for the recovery of the radio link which is performed dynamically by the UE. The UE detects RLF upon expiry of the RLF timer.

The CSI measurement configuration indicates, for example, a sub-frame set where CSI measurement is to be performed.

The RRM measurement configuration includes, for example, an RRM reporting configuration (ReportConfig). The RRM reporting configuration indicates parameters (e.g., threshold, or offset, or both) to be used for determination on each of one or more RRM reporting events. As one example, the RRM reporting event related to BWPs may indicate that a BWP in a neighbor cell becomes amount of offset better than the active BWP in the serving cell (PCell/PSCell). The RRM reporting event related to BWPs may be defined by modifying the existing reporting events (e.g., events A1 to A6, C1 and C2) related to handover, CA and DC.

For example, the RRM reporting events related to BWPs may be defined by replacing the term“Serving” in the existing reporting events with “active BWP” (or “default BWP”). Further, the RRM reporting events related to BWPs may be defined by replacing the term “Neighbour” in the existing reporting events with “BWP” (configured in MeasObject). The RRM reporting events related to BWPs may include the following:

Event D1: Serving BWP becomes better than absolute threshold;

Event D2: Serving BWP becomes worse than absolute threshold;

Event D3: Neighbour BWP becomes amount of offset better than Primary BWP(or default BWP);

Event D4: Neighbour BWP becomes better than absolute threshold;

Event D5: Primary BWP (or default BWP) becomes worse than absolute threshold 1 AND Neighbour BWP becomes better than another absolute threshold 2;

Event D6: Neighbour BWP becomes amount of offset better than Secondary BWP.

Note that, a cell list (e.g., cellToAddModList) for measurement indicated in MeasObject includes identifiers of cells to be measured (e.g., Cell Index, or PCI). However, a BWP not including any SSBs does not have its specific (sub-)PCI. Therefore, instead of measurement for the BWP not including any SSBs, measurement for the cell defining SSB may be performed. Alternatively, in order to indicate the BWP not including any SSBs, the PCI of the BWP including the cell defining SSB associated therewith (i.e., the PCI designated by the cell defining SSB), or a virtual PCI may be assigned to it. Alternatively, a BWP index may be used as an alternative (or substitute) identifier.

The UE 12 can be configured by the RAN node 11 with one or more DL BWPs included in one component carrier bandwidth (i.e., system bandwidth or channel bandwidth). The UE 12 handles inter-BWP measurement within the system bandwidth as inter-frequency measurement. This measurement may be RLM measurement or RRM measurement within the BWP set (or the BWP group) corresponding to the serving cell from the UE perspective (i.e., physical cell) configured in the UE 12. In addition, or alternatively, this measurement may be RRM measurement between any BWPs in the BWP set corresponding to the serving cell from the UE perspective (physical cell) configured in the UE 12 and a BWP(s) outside the BWP set (i.e., BWP(s) corresponding to a neighbor cell (physical cell) within the system bandwidth). Note that, the configuration for measuring a BWP(s) outside the BWP set at least includes information needed for measurement (e.g., RRM measurement), and it does not necessarily include normal BWP-related information (e.g. a configuration information about a BWP needed for the UE to camp on this BWP). The term “measurement BWP set” may be defined to collectively refer to those BWPs (and BWP sets).

Figure 11:
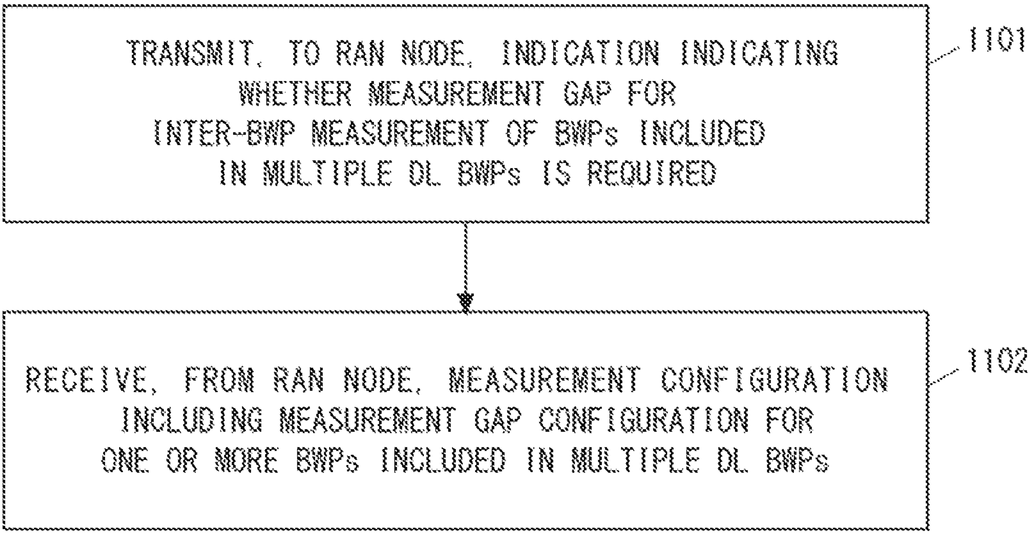
FIG. 11 is a flowchart showing an example of an operation of a radio terminal according to a first embodiment.

FIG. 11 is a flowchart showing a process 1100 that is an example of an operation performed by the UE 12. In Step 1101, the UE 12 transmits, to the RAN node 11, indication indicating whether a measurement gap is required or not. This indication indicates whether a measurement gap is required for inter-BWP measurement among BWPs included in multiple DL BWPs (i.e., DL BWPs with different frequencies or different numerologies or both). In Step 1102, the UE 12 receives, from the RAN node 11, a measurement configuration (e.g., an RRM measurement configuration) including a measurement gap configuration for measurement of one or more BWPs included in these DL BWPs.

The measurement gap is a time period in which UE uplink and downlink transmission is not scheduled, and accordingly the UE can perform measurements. In other words, the measurement gap defines a period which the UE is allowed to use for measurements.

Figure 12:
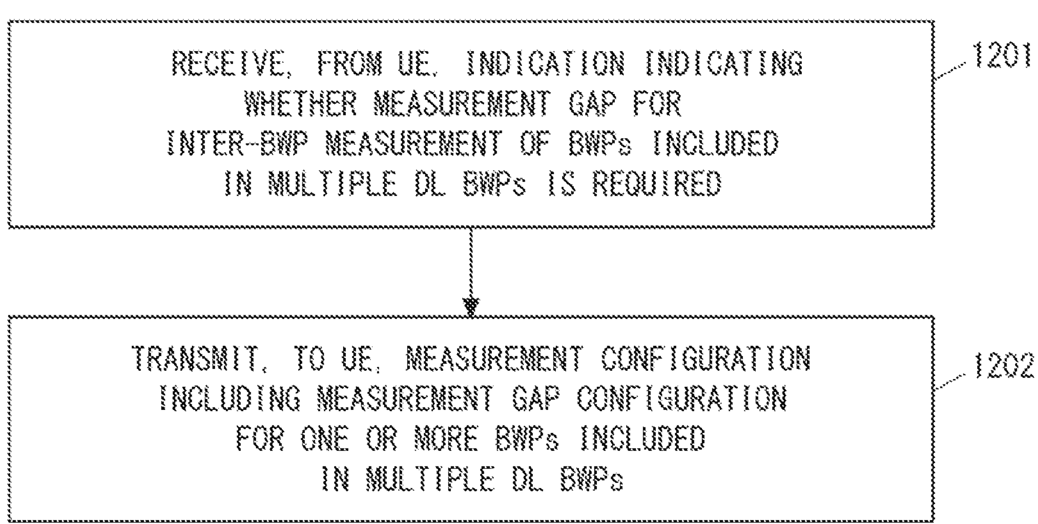
FIG. 12 is a flowchart showing an example of an operation of a RAN node according to the first embodiment.

FIG. 12 is a flowchart showing a process 1200 that is an example of an operation performed by the RAN node 11. In Step 1201, the RAN node 11 receives, from the UE 12, indication indicating whether a measurement gap for inter-BWP measurement among BWPs included in multiple DL BWPs is required. In Step 1202, the RAN node 11 transmits, to the UE 12, a measurement configuration including a measurement gap configuration for measurement of one or more BWPs included in these DL BWPs.

In some implementations, the indication indicating whether a measurement gap for inter-BWP measurement is required may indicate whether the UE 12 needs a measurement gap for measurement of one or more BWPs that are included in the DL BWPs but are different from the BWP to be activated for the UE 12. The BWP to be activated for the UE 12 is the BWP corresponding to the serving cell (physical cell). In other words, this indication may indicate whether, when one BWP is activated for the UE 12, the UE 12 needs a measurement gap for measurement of other BWPs different from this active BWP. For example, this indication may indicate that, when BWP #1 is activated for the UE 12, a measurement gap is required for measurement of at least one of BWP #2 and BWP #3. BWP #1, BWP #2 and BWP #3 are included in the same component carrier bandwidth (i.e., system bandwidth or channel bandwidth).

In some implementations, the indication indicating whether a measurement gap for inter-BWP measurement is required may indicate, per BWP, whether the UE 12 needs a measurement gap for one or more BWPs that are included in the multiple DL BWPs but are different from the BWP to be activated for the UE 12. In other words, this indication may indicate whether the UE 12 needs a measurement gap for measurement of a specific BWP(s) included in the multiple DL BWPs but different from the BWP to be activated for the UE 12. For example, this indication may indicate that, when BWP #1 is activated for the UE 12, a measurement gap is needed for measurement of BWP #2 while a measurement gap is not needed for measurement of BWP #3.

In some implementations, the indication indicating whether a measurement gap for inter-BWP measurement is required may include information regarding all BWP pairs included in the multiple DL BWPs (or a specific BWP pair indicated by the RAN node). To be more specific, this indication may indicate whether, when one BWP of each BWP pair is activated for the UE 12, the UE 12 needs a measurement gap for measurement of the other BWP of each BWP pair. Further, this method may be applied to a combination of three or more BWPs (BWP combination (BwC)) included in the multiple DL BWPs. For example, this indication may indicate whether, when one BWP of each BWP combination is activated for the UE 12, the UE 12 needs measurement gaps for measurement of each remaining BWPs of this BWP combination.

The measurement gap configuration, which is transmitted from the RAN node 11 to the UE 12, indicates the configuration regarding a measurement gap to be used by the UE 12 to measure one or more BWPs different from the activated BWP when one of the multiple DL BWPs is activated for the UE 12. The measurement gap configuration indicates, for example, at least one of: the presence or absence of a measurement gap; the length of a measurement gap; and the pattern of a measurement gap. For example, this measurement gap configuration may indicate the presence or absence of a measurement gap when BWP #1 is activated for the UE 12. When a measurement gap for BWP #1 is configured, the UE 12 may perform measurement of one or both of BWP #2 and BWP #3 in this measurement gap.

The UE 12 may determine the indication, which indicates whether a measurement gap for inter-BWP measurement is required, depending on the RF receiver configuration of the UE 12 and the number of BWPs configured simultaneously (in other words, the number of BWPs included in the configured BWP group). To be specific, to generate this indication, the UE 12 may take into account the number of RF receivers in the UE 12. The RF receivers are also referred to as RF chains.

The following provides examples of the indication indicating need or no need of a measurement gap for inter-BWP measurement, which is transmitted from the UE 12 to the RAN node 11, with reference to FIGS. 13A to 13C, FIGS. 14A to 14C, and FIGS. 15A to 15C. Consider as an example the case where the UE 12 is equipped with two RF chains (i.e., RF chain #1 and RF chain #2). Further, it is assumed in this example that the bandwidth that can be covered by each RF chain of the UE 12 (which is also referred to as RF bandwidth) is larger than the bandwidth of one BWP but smaller than the total bandwidth of two BWPs. Accordingly, in the case of measuring multiple BWPs with one RF chain, the UE 12 needs to sequentially receive signals in each of these BWPs, while changing the RF (frequency) of this RF chain as appropriate.

Figure 13A:
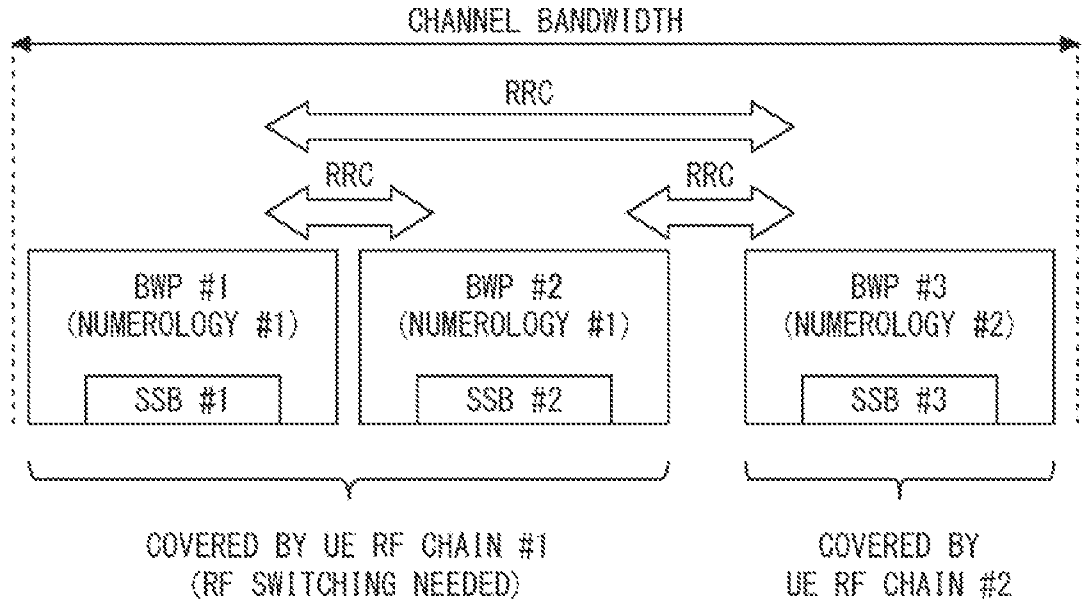
FIG. 13A is a diagram showing an example of use of Bandwidth parts (BWPs)
Figure 13B:
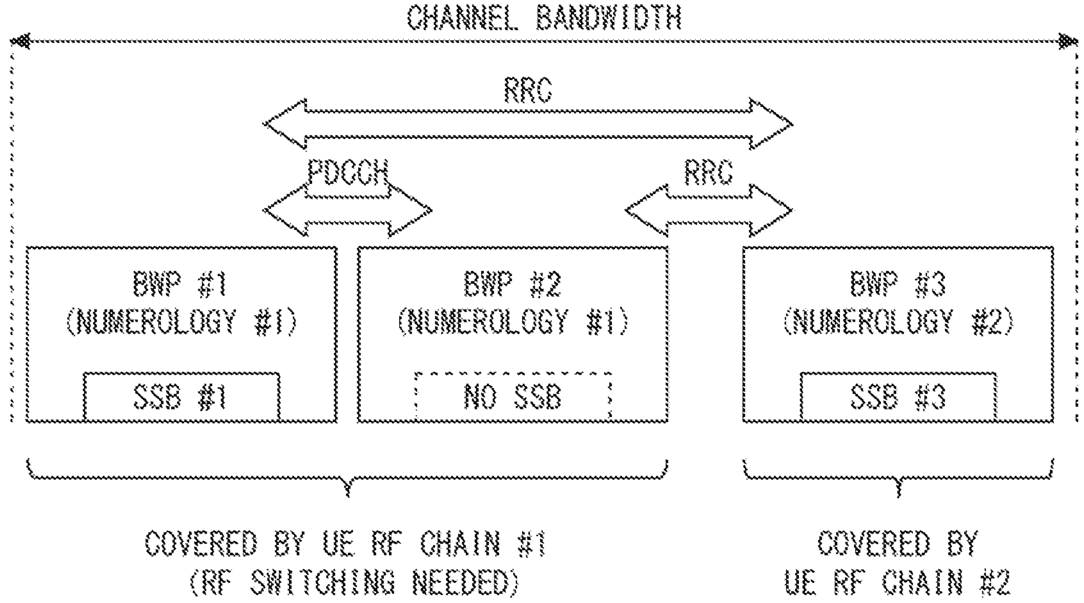
FIG. 13B is a diagram showing an example of use of Bandwidth parts (BWPs)
Figure 13C:
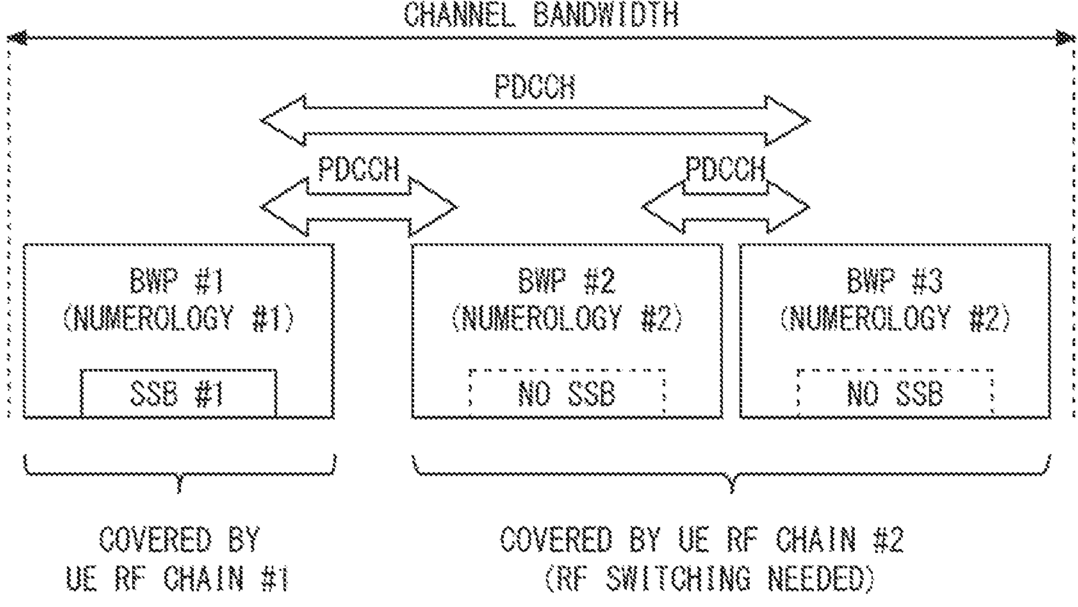
FIG. 13C is a diagram showing an example of use of Bandwidth parts (BWPs)

FIGS. 13A to 13C show three examples of one or more BWPs (i.e. a BWP set) configured in one component carrier bandwidth. In the example of FIG. 13A, three BWP groups are configured in one component carrier bandwidth (i.e., channel bandwidth or system bandwidth). Each BWP group consists of one BWP. Specifically, BWP #1, BWP #2, and BWP #3 shown in FIG. 13A include SSB #1, SSB #2, and SSB #3, respectively. According to the definition of the terms in this specification, one cell from the network perspective (i.e., logical cell) includes three cells from the UE perspective (i.e., physical cells) in the example of FIG. 13A. Switching of the active BWP among those three BWPs (i.e., among three physical cells) corresponds to switching of the active BWP among BWP groups (i.e., among physical cells), which is accordingly performed by RRC signaling (e.g., a RRC Reconfiguration message). For example, the UE 12 receives signals sequentially in BWP #1 and BWP #2 with RF chain #1, while it receives signals in BWP #3 with RF chain #2.

In the example of FIG. 13B, two BWP groups are configured in one component carrier bandwidth (i.e., channel bandwidth or system bandwidth). One of the two BWP groups includes BWP #1 and BWP #2, while the other one includes BWP #3. BWP #1 and BWP #2 are associated with (cell defining) SSB #1 in BWP #1. BWP #3 is associated with (cell defining) SSB #3 in BWP #3. According to the definition of the terms in this specification, one logical cell includes two physical cells in the example of FIG. 13B. Switching of the active BWP between BWP #1 and BWP #2 corresponds to switching of the active BWP within one BWP group (i.e., one physical cell), which is accordingly performed by PDCCH/DCI (i.e., DCI transmitted on a NR PDCCH). On the other hand, switching of the active BWP between BWP #1 and BWP #3 and between BWP #2 and BWP #3 corresponds to switching of the active BWP between BWP groups (i.e., between physical cells), which is accordingly performed by RRC signaling (e.g., a RRC Reconfiguration message). For example, the UE 12 receives signals sequentially in BWP #1 and BWP #2 with RF chain #1, while it receives signals in BWP #3 with RF chain #2.

In the example of FIG. 13C, one BWP group is configured in one component carrier bandwidth (i.e., channel bandwidth or system bandwidth). This BWP group includes BWP #1, BWP #2 and BWP #3. Those three BWPs are associated with (cell defining) SSB #1 in BWP #1. According to the definition of the terms in this specification, one logical cell includes one physical cell in the example of FIG. 13C.

Switching of the active BWP among these three BWPs (i.e., three physical cells) corresponds to switching of the active BWP within one BWP group (i.e., one physical cell), which is accordingly performed by PDCCH/DCI. For example, the UE 12 receives signals in BWP #1 with RF chain #1, while it receives signals sequentially in BWP #2 and BWP #3 with RF chain #2.

FIGS. 14A to 14C show one example of the indication of need or no need of measurement gaps by the UE 12. In the example of FIGS. 14A to 14C, the UE 12 notifies the RAN node 11 of whether the UE 12 needs a measurement gap for inter-BWP measurement of one or more BWPs that are included in the three DL BWPs but are different from the BWP to be activated for the UE 12.

FIG. 14A is related to the BWP configuration of FIG. 13A. When the active BWP is BWP #1, the UE 12 transmits, to the RAN node 11, the indication indicating that it needs a measurement gaps for measurement of BWP #2 while it does not need a measurement gap for measurement of BWP #3. When the active BWP is BWP #2, the UE 12 transmits, to the RAN node 11, the indication indicating that it needs a measurement gap for measurement of BWP #1 while it does not need a measurement gap for measurement of BWP #3. When the active BWP is BWP #3, the UE 12 transmits, to the RAN node 11, the indication indicating that it needs no measurement gaps for measurement of BWP #1 and BWP #2.

FIG. 14B is related to the BWP configuration of FIG. 13B. In the case of FIG. 14B, the UE 12 transmits, to the RAN node 11, the indication about need or no need of measurement gaps which is the same as that in the case of FIG. 14A.

FIG. 14C is related to the BWP configuration of FIG. 13C. When the active BWP is BWP #1, the UE 12 transmits, to the RAN node 11, the indication indicating that it needs no measurement gaps for measurement of BWP #2 and BWP #3. When the active BWP is BWP #2, the UE 12 transmits, to the RAN node 11, the indication indicating that it needs a measurement gap for measurement of BWP #3 while it does not need a measurement gap for measurement of BWP #1. When the active BWP is BWP #3, the UE 12 transmits, to the RAN node 11, the indication indicating that it needs a measurement gaps for measurement of BWP #2 while it does not need a measurement gap for measurement of BWP #1.

FIGS. 15A to 15C show another example of the indication of need or no need of measurement gaps by the UE 12. In the example of FIGS. 15A to 15C, the UE 12 sends, to the RAN node 11, information about three different BWP pairs included in the three DL BWPs. To be more specific, the UE 12 notifies the RAN node 11 of whether, when one BWP of each BWP pair is activated for the UE 12, the UE 12 needs a measurement gap for measurement of the other BWP of this BWP pair.

FIG. 15A is related to the BWP configuration of FIG. 13A. The UE 12 transmits, to the RAN node 11, the indication indicating that a measurement gap is needed for the pair of BWP #1 and BWP #2. This indication means that, when one of BWP #1 and BWP #2 (e.g., BWP #1) is the active BWP, a measurement gap is needed for measurement of the other BWP (e.g., BWP #2). The UE 12 transmits, to the RAN node 11, the indication indicating that a measurement gap is not needed for the pair of BWP #1 and BWP #3. This indication means that, when one of BWP #1 and BWP #3 (e.g., BWP #1) is the active BWP, no measurement gap is needed for measurement of the other BWP (e.g., BWP #3). Likewise, the UE 12 transmits, to the RAN node 11, indication indicating that a measurement gap is not needed for the pair of BWP #2 and BWP #3.

FIG. 15B is related to the BWP configuration of FIG. 13B. In the case of FIG. 15B, the UE 12 transmits, to the RAN node 11, indication about need or no need of measurement gaps which is the same as that in the case of FIG. 15A.

FIG. 15C is related to the BWP configuration of FIG. 13C. The UE 12 transmits, to the RAN node 11, the indication indicating that no measurement gap is needed for the pair of BWP #1 and BWP #2. Likewise, the UE 12 transmits, to the RAN node 11, the indication indicating that no measurement gap is needed for the pair of BWP #1 and BWP #3. Meanwhile, the UE 12 transmits, to the RAN node 11, the indication indicating that a measurement gap is needed for the pair of BWP #2 and BWP #3.

The RAN node 11 may transmit, to the UE 12, a measurement gap configuration that is determined in consideration of the necessity of measurement gaps in the UE 12. To be specific, for example, in response to receiving the information shown in FIG. 14A from the UE 12, the RAN node 11 may configure the UE 12 with a measurement gap to be used for measurement between BWP #1 and BWP #2 when the BWP #1 is the active BWP. Alternatively, the RAN node 11 may operate so as to configure the UE 12 with no measurement gap for measurement between BWP #1 and BWP #2 when the BWP #1 is the active BWP.

The above-described description with reference to FIGS. 13A to 13C, FIGS. 14A to 14C, and FIGS. 15A to 15C refers to the case where the UE 12 is equipped with two RF chains and one system bandwidth includes three BWPs as an example for the sake of simplification. However, the above-described description is applicable also to the case where the UE 12 is equipped with only one RF chain, the case where the UE 12 is equipped with at least three RF chains, the case where one system bandwidth includes two BWPs, and the case where one system bandwidth includes at least four BWPs as a matter of course.

As can be understood from the above description, the RAN node 11 and the UE 12 operate as follows when one carrier bandwidth includes multiple BWPs. The UE 12 transmits, to the RAN node 11, an indication indicating whether a measurement gap is required for inter-BWP measurement among BWPs included in multiple DL BWPs within one carrier bandwidth. Further, the UE 12 receives, from the RAN node 11, a measurement configuration including a measurement gap configuration for one or more BWPs included in these multiple DL BWPs. Meanwhile, the RAN node 11 receives from the UE 12 the indication regarding need or no need of a measurement gap, and transmits to the UE 12 the measurement configuration including the measurement gap configuration. Thus, the RAN node 11 can be aware of whether or not the UE 12 needs a measurement gap for measurement between multiple DL BWPs within one carrier bandwidth. Further, the RAN node 11 can transmit, to the UE 12, the measurement gap configuration that is determined in consideration of the necessity of measurement gaps in the UE 12. Thus, the RAN node 11 and the UE 12 allow the UE 12 to be configured with a proper measurement gap for measurement between multiple DL BWPs within one carrier bandwidth.

Second Embodiment

This embodiment provides a specific example of the sequence (or procedure) in which the UE 12 transmits, to the RAN node 11, the indication indicating, per BWP, whether the UE 12 needs a measurement gap or not, which is described in the first embodiment. A configuration example of a radio communication network according to this embodiment is similar to that shown in FIG. 10.

Figure 16:
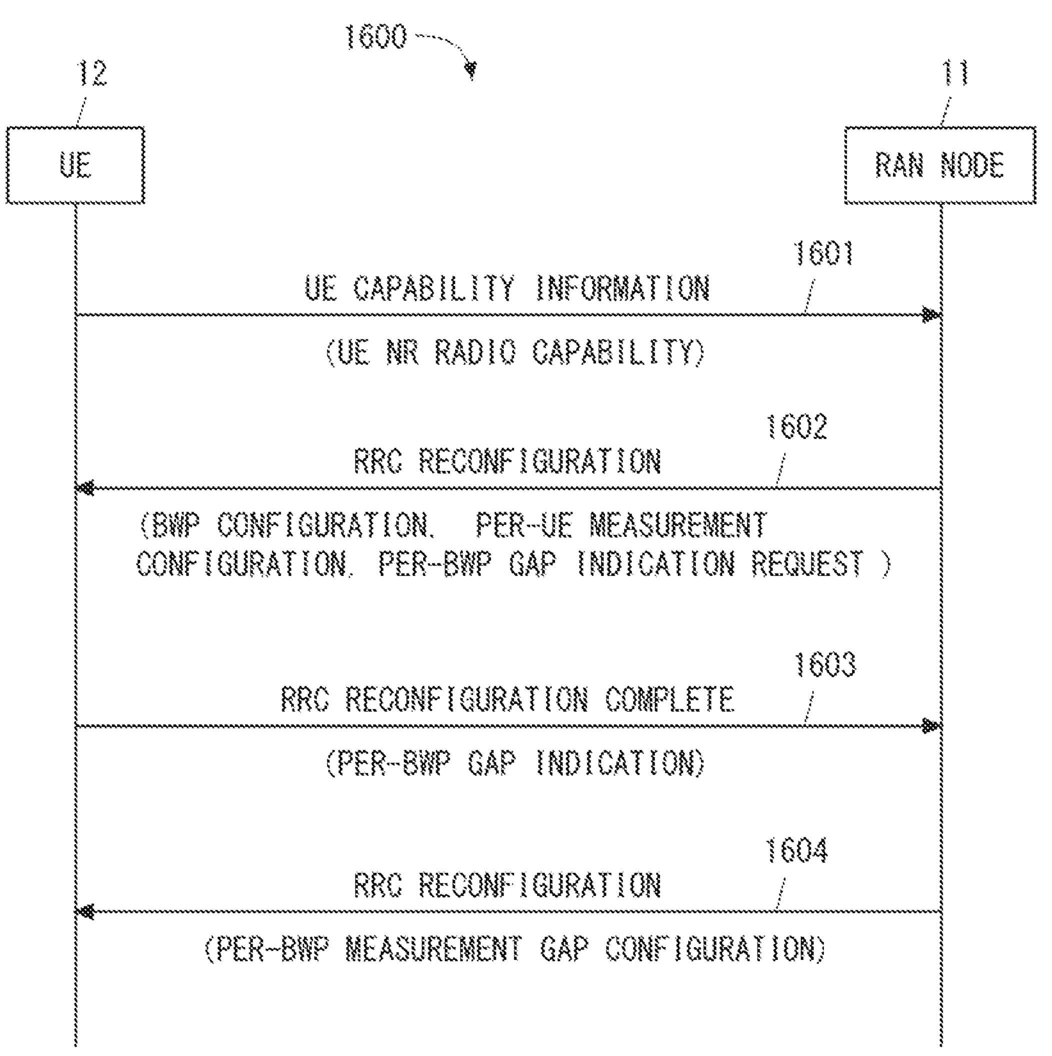
FIG. 16 is a sequence diagram showing an example of operations of a radio terminal and a RAN node according to a second embodiment.

FIG. 16 is a sequence diagram showing a process 1600 that is an example of operations of the RAN node 11 and the UE 12 according to this embodiment. In Step 1601, the UE 12 transmits UE NR radio capability information to the RAN node 11 (e.g., gNB). The UE NR radio capability information includes information indicating that a measurement gap is needed for inter-frequency (inter-BWP) measurement and information indicating that the UE 12 supports indication of need or no need of a measurement gap per-BWP (per-BWP Gap Indication). The UE NR radio capability information may be transmitted using a UE Capability Information message.

In Step 1602, the RAN node 11 transmits, to the UE 12, a BWP configuration and a per-UE measurement gap configuration (e.g., MeasGapConfig). The RAN node 11 further transmits, to the UE 12, a request for transmitting an indication indicating need or no need of a per-BWP measurement gap. The information element (IE) corresponding to this request may be a "PerBWP-GapIndicationRequest" IE. These configuration and request may be transmitted using an RRC Reconfiguration message.

The UE 12 performs required internal configuration according to the received BWP configuration, and configures a per-UE measurement gap according to the received per-UE measurement gap configuration (MeasGapConfig).

In Step 1603, the UE 12 transmits, to the RAN node 11, indication indicating need or no need of a measurement gap per BWP in the BWP set designated by the BWP configuration. The information element (IE) corresponding to this indication may be a "PerBWP-GapIndicationList" IE. This indication may be transmitted using an RRC Reconfiguration Complete message.

In Step 1604, the RAN node 11 transmits, to the UE 12, a per-BWP measurement gap configuration in response to (or in accordance with) the received indication (perBWP-GapIndication). The per-BWP measurement gap configuration may be "BWP specific measurement gap configuration". The information element (IE) corresponding to the per-BWP measurement gap configuration may be a "measGapConfigPerBWP" IE or a "measGapConfig-PerBWP-List" IE.

According to the sequence described in this embodiment, the RAN node 11 and the UE 12 allows the UE 12 to be configured with per-BWP measurement gaps.

Third Embodiment

This embodiment provides a method for measurement configuration in order to deal with switching of the active BWP among multiple BWPs included in one BWP group. A configuration example of a radio communication network according to this embodiment is similar to that shown in FIG. 10.

In this embodiment, in order to deal with switching of the active BWP (not involving a change of the cell defining SSB) among multiple DL BWPs included in one DL BWP group, the RAN node 11 provides the UE 12, in advance, via RRC signaling (e.g., a RRC Reconfiguration message), with multiple measurement configurations respectively corresponding to the cases where a respective one of the multiple DL BWPs is the active BWP. In response to switching of the active BWP among BWPs within the BWP group for communication between the UE 12 and the RAN, the UE 12 selects and uses a measurement configuration corresponding to the active BWP from among the previously received measurement configurations.

For example, when one BWP group includes first and second BWPs, the RAN node 11 provides the UE 12, via RRC signaling (e.g., RRC Reconfiguration message), with a first measurement configuration to be used when the first BWP is the active BWP and a second measurement configuration to be used when the second BWP is the active BWP. The UE 12 selects the first measurement configuration when the active BWP is the first BWP, and uses it for measurements (e.g., RLM measurement, RRM measurement, and CSI measurement). Further, in response to switching of the active BWP from the first BWP to the second BWP, the UE 12 autonomously switches measurement configuration from the first measurement configuration to the second measurement configuration. Then, the UE 12 uses, for measurements, the second measurement configuration corresponding to the active BWP after switching.

As described earlier, switching of the active BWP within the BWP group can be done by lower-layer signaling, such as DCI on NR PDCCH, without using RRC signaling. Switching of the active BWP in the BWP group is, in other words, switching of the active BWP without change of the cell defining SSB. Specifically, the RAN node 11 and the UE 12 according to this embodiment do not need to use RRC signaling to update the measurement configuration when switching the active BWP within the BWP group. Thus, the RAN node 11 and the UE 12 according to this embodiment can quickly switch the measurement configuration in response to switching of the active BWP within the BWP group, and accordingly can quickly start the measurement operation in accordance with the measurement configuration corresponding to the active BWP after switching.

The multiple measurement configurations with which the RAN node 11 provides the UE 12 in advance may include measurement gap configurations as described in the first embodiment. In addition, or alternatively, the multiple measurement configurations with which the RAN node 11 provides the UE 12 in advance may include other measurement configurations different from the measurement gap configurations. For example, each of the multiple measurement configurations may include a measurement configuration for RLM (e.g., RS type, parameters for RLM (e.g., the expiration period of an RLF timer)). Each of the multiple measurement configurations may include a measurement configuration for RRM (e.g., RS type, parameters for RRM reporting events, neighbor cells to be measured (neighbor BWPs)).

To be specific, the measurement configuration (e.g. MeasConfig IE) may include any one or combination of the following information:

- Configuration regarding measurement objects (measurement object (e.g., MeasObject IE));
- Configuration regarding measurement reporting (measurement report configuration (e.g., ReportConfig IE));
- Identifiers of respective measurement configurations (measurement identity (e.g., MeasId IE));
- Configuration regarding measurement criteria (s-measure configuration (e.g., s-MeasureCnfig IE)); and
- Configuration regarding measurement gaps (measurement gap configuration (e.g., MeasGapConfig IE)).

The configuration regarding measurement objects (measurement object (e.g., MeasObject IE)) may include any one or combination of: carrier frequency information (e.g., NR ARFCN); configuration information regarding reference signals (e.g., ReferenceSignalConfig IE), a list of cells to be measured; and an offset regarding radio quality for a specific measurement reporting event (e.g., offsetFreq). The configuration information regarding reference signals may include at least one of: information about measurement timing used for SSB-based measurement (e.g., SSB measurement timing configuration (SMTC)); presence of SSB in a cell (physical cell, BWP) to be measured (e.g., SSB presence); and information about CSI-RS radio resources used for CSI-RS-based measurement. Further, the offset regarding radio quality may be indicated by a combination of an RS type to be measured and a type of radio quality (e.g., rsrpOffsetSSB, rsrqOffsetSSB, rsrpOffsetCSI-RS, rsrqOffsetCSI-RS).

The configuration regarding measurement reporting (e.g., ReportConfig IE) may include, for example, a reporting type (e.g., periodical, event triggered), event configuration (e.g., eventTriggerConfig), or periodical reporting configuration (e.g., peridocialReportConfig). It may further include an RS type (e.g., SSB (i.e. NR-SS), CSI-RS).

The identifier of each measurement configuration (e.g., MeasId IE) may be indicated (or configured) by a combination of configuration information regarding a measurement object and configuration information regarding a measurement reporting.

The configuration regarding measurement criteria (e.g., s-MeasureCnfig IE) may include, for example, a threshold (e.g., RSRP threshold) that serves as a basis for determining whether to start measurement of a neighbor cell. It may further include information about an RS type (e.g., SSB (i.e. NR-SS), CSI-RS) to be used for the determination, and include thresholds per RS type.

The configuration regarding measurement gaps (e.g., MeasGapConfig IE) may include, for example, a measurement gap for each UE based on the serving cell (i.e. per-UE measurement gap), a measurement gap controlled by the network (e.g. RAN node) (i.e. network controlled small gap (NCSG)), or a measurement gap for each component carrier in carrier aggregation (i.e. per-CC measurement gap). In addition, or alternatively, the configuration regarding measurement gaps may include a measurement gaps for each BWP (i.e. per-BWP measurement gap). The per-BWP measurement gap may include information indicating, per BWP, any one of normal measurement gap (i.e., per UE meas gap), network controlled measurement gap (i.e., NCSG), and no need of any measurement gaps (e.g., no gap and no NCSG).

Figure 17:
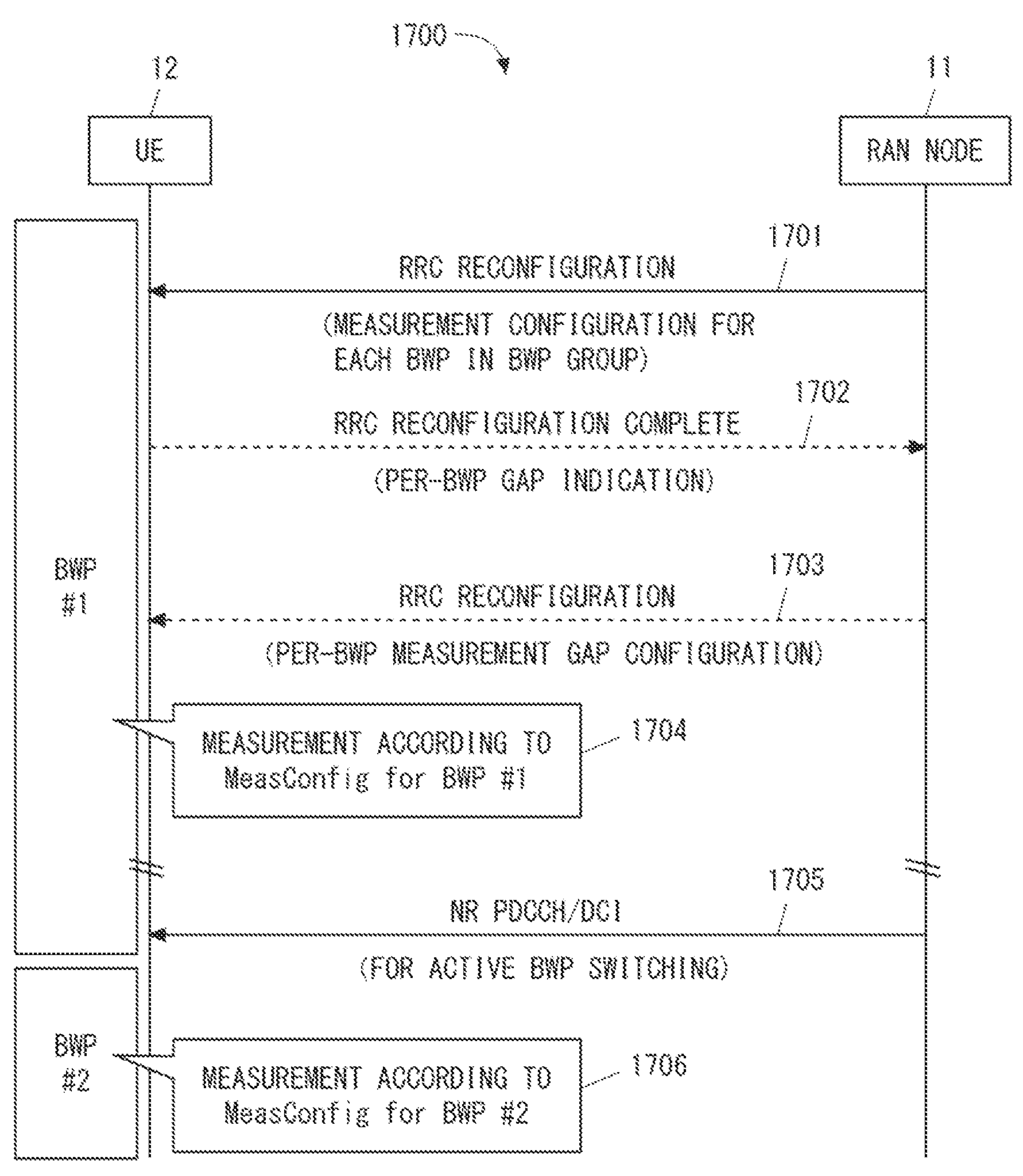
FIG. 17 is a sequence diagram showing an example of operations of a radio terminal and a RAN node according to a third embodiment.

FIG. 17 is a sequence diagram showing a process 1700 that is an example of operations of the RAN node 11 and the UE 12 according to this embodiment. It is assumed in this example that a BWP group consists of BWP #1 including an SSB and BWP #2 not including any SSBs, and that the UE 12 first camps on BWP #1 (i.e., BWP #1 is the active BWP). In other words, BWP #1 is the serving cell (i.e., physical cell) of the UE 12.

In Step 1701, the RAN node 11 transmits an RRC Reconfiguration message to the UE 12. This RRC Reconfiguration message includes multiple measurement configurations corresponding to respective multiple BWPs within the BWP group. Each measurement configuration indicates a measurement configuration to be used when the active BWP is the corresponding BWP among the multiple BWPs within the BWP group. This RRC Reconfiguration message may include a request for transmitting an indication indicating need or no need of a per-BWP measurement gap. The information element (IE) corresponding to this request may be a "PerBWP-GapIndicationRequest" IE.

In Step 1702, the UE 12 transmits an RRC Reconfiguration Complete message to the RAN node 11. This RRC Reconfiguration Complete message may include an indication indicating whether a per-BWP measurement gap is required. The information element (IE) corresponding to this indication may be "PerBWP-GapIndicationList" IE. In Step 1703, the RAN node 11 transmits an RRC Reconfiguration message including a per-BWP measurement gap configuration to the UE 12. The information element (IE) corresponding to this measurement gap configuration may be "measGapConfigPerBWP-List" IE. The indication in Step 1702 may be the same as the indication indicating whether a measurement gap is required described in the first embodiment. The measurement gap configuration in Step 1703 may be the same as the measurement gap configuration described in the first embodiment. Note that, in this embodiment Steps 1702 and 1703 may be omitted.

The UE 12 uses the measurement configuration corresponding to BWP #1 received in Step 1701, and performs measurement in BWP #1 (e.g., RLM measurement, CSI measurement, RRM measurement) and measurement in BWP #2 (e.g., RRM measurement) (Step 1704).

In Step 1705, the RAN node 11 transmits control information indicating switching of the active BWP from BWP #1 to BWP #2, i.e., DCI on a NR PDCCH, to the UE 12. In response to receiving this control information (PDCCH/DCI), the UE 12 switches the active BWP to BWP #2. Thus, BWP #2 becomes the serving cell (physical cell) of the UE 12. Further, upon switching of the active BWP, the UE 12 switches from the measurement configuration corresponding to BWP #1 to the measurement configuration corresponding to BWP #2, and performs measurement in BWP #2 (e.g., RLM measurement, CSI measurement, RRM measurement) and measurement in BWP #1 (e.g., RRM measurement) in accordance with the measurement configuration corresponding to BWP #2 (Step 1706).

The measurement in Step 1706 may include SSB-based measurement and CSI-RS based measurement. If the UE 12 is configured with SSB-based measurement, the UE 12 may monitor the SSB in BWP #1 for RLM measurement. In this case, the UE 12 may continuously use the configuration regarding SSB-based measurement in the measurement configuration corresponding to BWP #1 for SSB-based measurement after switching of the active BWP from BWP #1 to BWP #2. In other words, after switching the active BWP from BWP #1 to BWP #2, the UE 12 may use the measurement configuration corresponding to BWP #2 in CSI-RS based measurement.

In addition, or alternatively, measurement configurations for the component carrier frequency (measObject) may be commonly used for measurements before and after switching of the active BWP, except for measurement configurations specific to BWP #1 and BWP #2.

In addition, or alternatively, after switching the active BWP from BWP #1 to BWP #2, the UE 12 may fall back to the default measurement gap configuration (e.g., a per-UE measurement gap independent of the BWPs).

Fourth Embodiment

This embodiment provides a method for measurement configuration in order to deal with switching of the active BWP among multiple BWPs included in one BWP group. A configuration example of a radio communication network according to this embodiment is similar to that shown in FIG. 10.

In this embodiment, in order to deal with switching of the active BWP (not involving a change of the cell defining SSB) among multiple DL BWPs included in one DL BWP group, the RAN node 11 provides the UE 12, in advance, via RRC signaling (e.g., a RRC Reconfiguration message), with a measurement configuration which enables to replace (swap) the relationship between the serving cell (serving BWP, active BWP) and the neighbor cell (non-serving BWP, neighbor BWP). Upon switching of the active BWP among BWPs within the BWP group for communication between the UE 12 and the RAN, the UE 12 uses the previously received measurement configuration by replacing the relationship between the serving cell (serving BWP, active BWP) and the neighbor cell (non-serving BWP, neighbor BWP).

For example, when one BWP group includes first and second BWPs, the RAN node 11 provides the UE 12, via RRC signaling (e.g., RRC Reconfiguration message), with the measurement configuration corresponding to the situation where the first BWP is the serving cell (serving BWP) and the second BWP is the neighbor cell (neighbor BWP, non-serving BWP). When the active BWP is the first BWP, the UE 12 performs measurements (e.g., RLM measurement, RRM measurement, CSI measurement) in accordance with this measurement configuration. Further, upon switching of the active BWP from the first BWP to the second BWP, the UE 12 uses the already received measurement configuration by replacing the relationship between the serving cell (serving BWP) and the neighbor cell (neighbor BWP, non-serving BWP) in this measurement configuration.

The RAN node 11 and the UE 12 according to this embodiment do not need RRC signaling for updating the measurement configuration when switching the active BWP within the BWP group. Thus, the RAN node 11 and the UE 12 according to this embodiment can quickly update the measurement configuration in response to switching of the active BWP within the BWP group, and accordingly can quickly start the measurement operation in accordance with the measurement configuration corresponding to the active BWP after switching.

Figure 18:
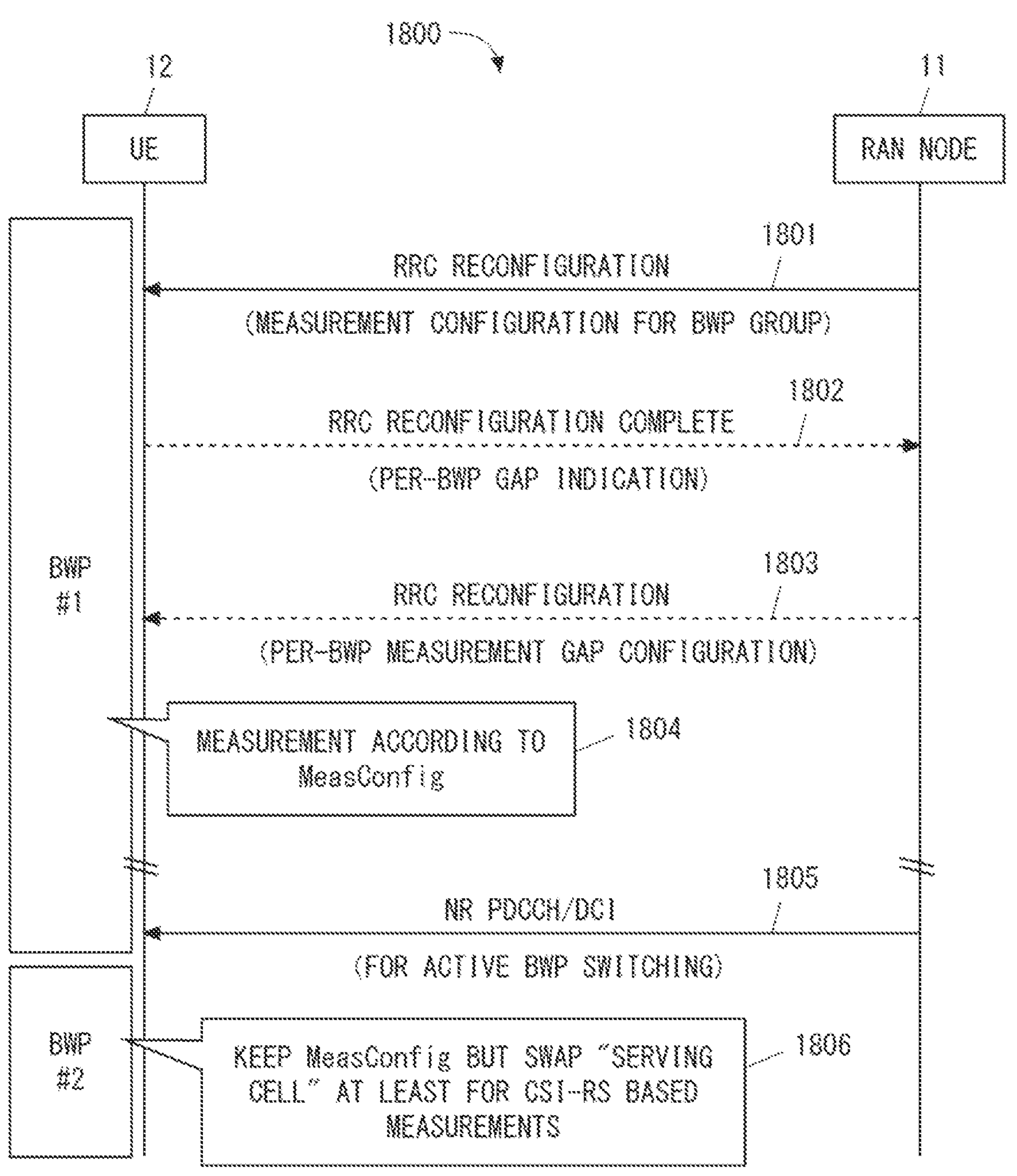
FIG. 18 is a sequence diagram showing an example of operations of a radio terminal and a RAN node according to a fourth embodiment.

FIG. 18 is a sequence diagram showing a process 1800 that is an example of operations of the RAN node 11 and the UE 12 according to this embodiment. It is assumed in this example that a BWP group consists of BWP #1 including a SSB and BWP #2 not including any SSBs, and that the UE 12 first camps on BWP #1 (i.e., BWP #1 is the active BWP).

In Step 1801, the RAN node 11 transmits an RRC Reconfiguration message to the UE 12. This RRC Reconfiguration message includes a measurement configuration corresponding to the situation where BWP #1 is the serving cell (serving BWP) and BWP #2 is the neighbor cell (neighbor BWP).

Steps 1802 and 1803 are similar to Steps 1602 and 1603 of FIG. 16. Steps 1802 and 1803 may be omitted in this embodiment also.

The UE 12 uses the measurement configuration received in Step 1801, and performs measurement in BWP #1 (e.g., RLM measurement, CSI measurement, RRM measurement) and measurement in the neighbouring cell including BWP #2 (e.g., RRM measurement) (Step 1804).

In Step 1805, the RAN node 11 transmits control information indicating switching of the active BWP from BWP #1 to BWP #2, i.e., DCI on a NR PDCCH, to the UE 12. In response to receiving this control information (PDCCH/DCI), the UE 12 switches the active BWP to BWP #2. Further, upon switching of the active BWP, the UE 12 uses the previously received (i.e., already stored) measurement configuration by replacing the relationship between the serving cell (serving BWP, active BWP) and the neighbor cell (non-serving BWP, neighbor BWP) (Step 1806). Specifically, the UE 12 regards the serving cell (serving BWP) in the already stored measurement configuration as BWP #2, and performs measurement in accordance with at least part of this measurement configuration. Stated differently, the UE 12 regards BWP #2 as the serving cell (serving BWP) and regards BWP #1 as the neighbor cell (neighbor BWP), and performs measurement in accordance with at least part of the already stored measurement configuration.

The measurement in Step 1806 may include SSB-based measurement and CSI-RS based measurement. If the UE 12 is configured with SSB-based measurement, the UE 12 may monitor the SSB in BWP #1 for RLM measurement. In this case, the UE 12 may continuously use the configuration regarding SSB-based measurement in the measurement configuration corresponding to BWP #1 for SSB-based measurement after switching of the active BWP from BWP #1 to BWP #2. In other words, the UE 12 may regard the serving cell (serving BWP) in the previously received (i.e., already stored) measurement configuration as BWP #2 for CSI-RS based measurement after switching of the active BWP from BWP #1 to BWP #2. Stated differently, the UE 12 regards BWP #2 as the serving cell (serving BWP) and regards BWP #1 as the neighbor cell (neighbor BWP), and performs measurements in accordance with at least part of the already stored measurement configuration.

In addition, or alternatively, measurement configurations for the carrier frequency (measObject) may be commonly used for measurements before and after switching of the active BWP, except for measurement configurations specific to BWP #1 and BWP #2.

In addition, or alternatively, after switching the active BWP from BWP #1 to BWP #2, the UE 12 may fall back to the default measurement gap configuration (e.g., a per-UE measurement gap independent of the BWPs).

In addition, or alternatively, the RAN node 11 may transmit a configuration of "s-measure" to the UE beforehand, using the measurement configuration. The s-measure is an RSRP threshold and used for determining the start of measurement of the neighbor cell. When the RSRP of the serving cell falls below the s-measure, the UE 12 starts measurement of the neighbor cell. Further, the UE 12 may select the target of the s-measure between the SSB (i.e. ssb-rsrp) and the CSI-RS (i.e. csi-rsrp), and in this case, the RAN node 11 may indicate, to the UE 12, which of SSB-based and CSI-RS based the s-measure is. The UE 12 may make determination on the s-measure after switching of the active BWP from BWP #1 to BWP #2 by using a measured value (e.g., SSB-based RSRP or CSI-RS based RSRP) for the serving BWP after switching (i.e., BWP #2). Alternatively, the UE 12 may make determination on the s-measure by using a measured value for the serving BWP before switching (i.e., BWP #1).

The RAN node 11 may notify in advance the UE 12 of the way of treating the s-measure after switching of the active BWP (i.e., which of a measured value for the active BWP before switching and a measured value for the active BWP after switching is to be used for determination on the s-measure after switching of the active BWP). The RAN node 11 may indicate, in the measurement configuration or the configuration information of the BWP set, the way of treating s-measure after switching of the active BWP. Alternatively, the UE 12 may determine the RS type of the target of the s-measure after switching the active BWP, according to the configuration of the RS type (e.g., SSB or CSI-RS) of the target of the s-measure before switching the active BWP. For example, when the RS type of the target of the s-measure before switching the active BWP is the SSB, the UE 12 may use a measured value for the SSB for determination of the s-measure after switching the active BWP. Not that, the UE 12 may perform measurement on the SSB in the active BWP before switching when the active BWP after switching does not include any SSBs, or may perform measurement on the SSB in the active BWP after switching when the active BWP after switching includes the SSB.

For example, when the s-measure in the measurement configuration defines an RSRP threshold for the RS (e.g., NR-SS) in the SSB, the RAN node 11 may notify in advance the UE 12 of the s-measure to be used after switching of the active BWP within the BWP group in Step 1801. For example, when the new active BWP (e.g., active BWP #2) after switching of the active BWP within the BWP group does not include the SSB, the RAN node 11 may configure in advance an RSRP threshold for the CSI-RS to be used for the s-measure after switching of the active BWP. Alternatively, when the s-measure in the measurement configuration defines an RSRP threshold for the CSI-RS (and when the configuration of CSI-RS in BWP #2 is transmitted from the RAN node 11 to the UE 12), the UE 12 may continuously use the configuration of the s-measure before switching, even after switching the active BWP from BWP #1 to BWP #2.

Figure 19:
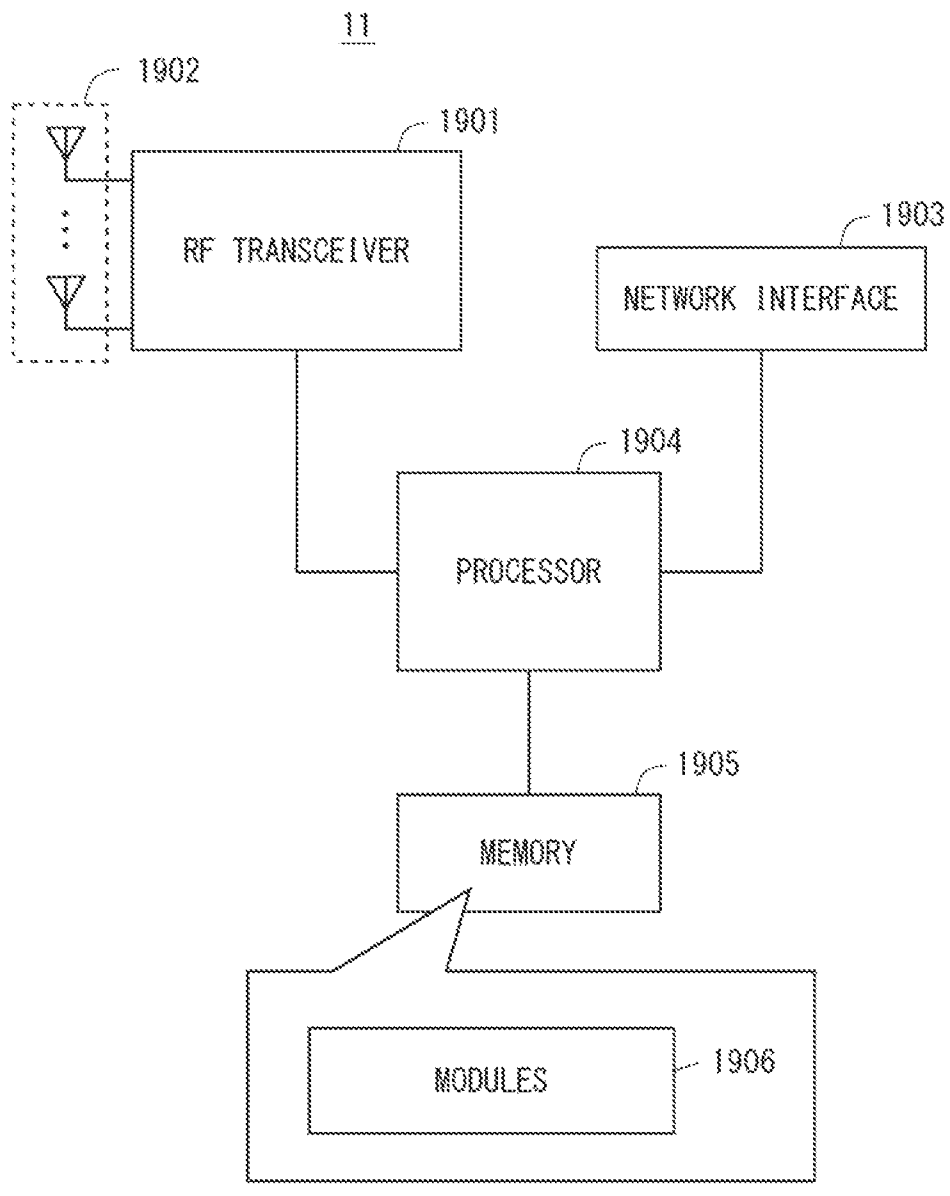
FIG. 19 is a block diagram showing a configuration example of a RAN node according to some embodiments.

The following provides configuration examples of the RAN node 11 and the UE 12 according to the above embodiments. FIG. 19 is a block diagram showing a configuration example of the RAN node 11 according to the above embodiments. Referring to FIG. 19, the RAN node 11 includes a Radio Frequency transceiver 1901, a network interface 1903, a processor 1904, and a memory 1905. The RF transceiver 1901 performs analog RF signal processing to communicate with NG UEs including the UE 12. The RF transceiver 1901 may include a plurality of transceivers. The RF transceiver 1901 is coupled to an antenna array 1902 and the processor 1904. The RF transceiver 1901 receives modulated symbol data from the processor 1904, generates a transmission RF signal, and supplies the transmission RF signal to the antenna array 1902. Further, the RF transceiver 1901 generates a baseband reception signal based on a reception RF signal received by the antenna array 1902, and supplies the baseband reception signal to the processor 1904. The RF transceiver 1901 may include an analog beamformer circuit for beam forming. The analog beamformer circuit includes, for example, a plurality of phase shifters and a plurality of power amplifiers.

The network interface 1903 is used to communicate with a network node (e.g., a control node and a transfer node of NG Core). The network interface 1903 may include, for example, a network interface card (NIC) conforming to the IEEE 802.3 series.

The processor 1904 performs digital baseband signal processing (i.e., data-plane processing) and control-plane processing for radio communication. The processor 1904 may include a plurality of processors. The processor 1904 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1904 may include a digital beamformer module for beam forming. The digital beamformer module may include a Multiple Input Multiple Output (MIMO) encoder and a pre-coder.

The memory 1905 is composed of a combination of a volatile memory and a non-volatile memory. The volatile memory is, for example, a Static Random Access Memory (SRAM), a Dynamic RAM (DRAM), or any combination thereof. The non-volatile memory is, for example, a mask Read Only Memory (MROM), an Electrically Erasable Programmable ROM (EEPROM), a flash memory, a hard disc drive, or any combination thereof. The memory 1905 may include a storage located apart from the processor 1904. In this case, the processor 1904 may access the memory 1905 via the network interface 1903 or an I/O interface (not shown).

The memory 1905 may store one or more software modules (computer programs) 1906 including instructions and data to perform processing by the RAN node 11 described in the above embodiments. In some implementations, the processor 1904 may be configured to load the software modules 1906 from the memory 1905 and execute the loaded software modules, thereby performing processing of the RAN node 11 described in the above embodiments.

Note that, if the RAN node 11 is a gNB-CU, the RAN node 11 does not need to include the RF transceiver 1901 (and the antenna array 1902).

Figure 20:
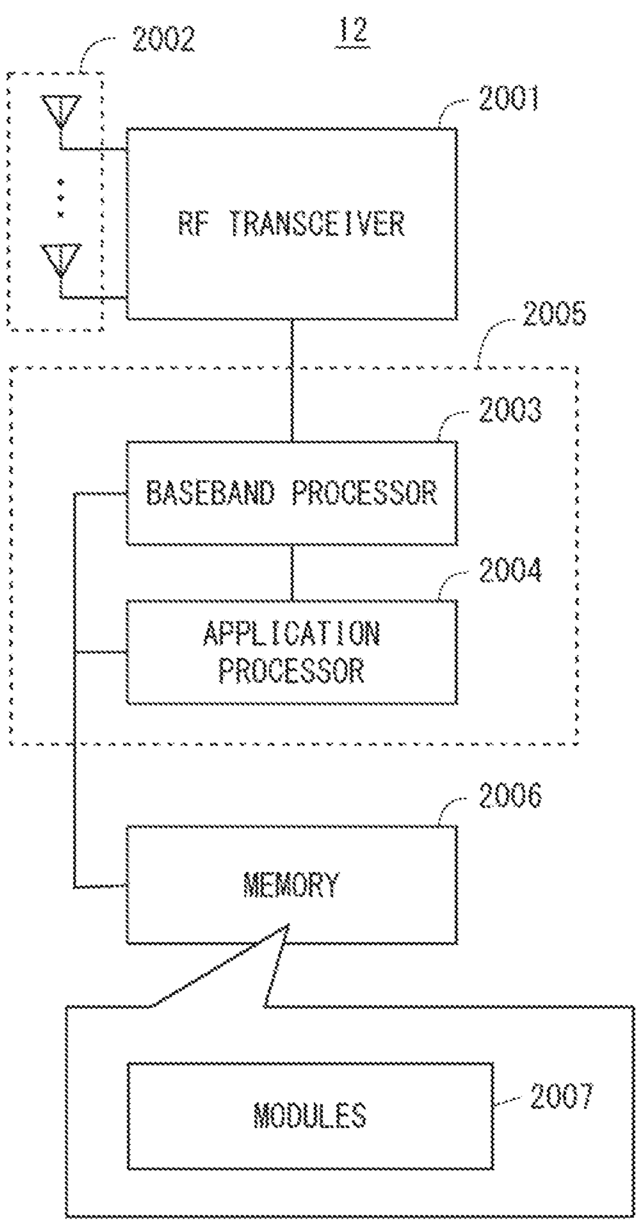
FIG. 20 is a block diagram showing a configuration example of a radio terminal according to some embodiments.

FIG. 20 is a block diagram showing a configuration example of the UE 12. A Radio Frequency (RF) transceiver 2001 performs analog RF signal processing to communicate with the NR NB 1. The RF transceiver 2001 may include a plurality of transceivers. The analog RF signal processing performed by the RF transceiver 2001 includes frequency up-conversion, frequency down-conversion, and amplification. The RF transceiver 2001 is coupled to an antenna array 2002 and a baseband processor 2003. The RF transceiver 2001 receives modulated symbol data (or OFDM symbol data) from the baseband processor 2003, generates a transmission RF signal, and supplies the transmission RF signal to the antenna array 2002. Further, the RF transceiver 2001 generates a baseband reception signal based on a reception RF signal received by the antenna array 2002, and supplies the baseband reception signal to the baseband processor 2003. The RF transceiver 2001 may include an analog beamformer circuit for beam forming. The analog beamformer circuit includes, for example, a plurality of phase shifters and a plurality of power amplifiers.

The baseband processor 2003 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 2003 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 2003 may include processing of a Non-Access Stratum (NAS) protocol, an RRC protocol, and MAC CEs.

The baseband processor 2003 may perform MIMO encoding and pre-coding for beam forming.

The baseband processor 2003 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 2004 described in the following.

The application processor 2004 is also referred to as a CPU, an MPU, a microprocessor, or a processor core. The application processor 2004 may include a plurality of processors (processor cores). The application processor 2004 loads a system software program (Operating System (OS)) and various application programs (e.g., a call application, a WEB browser, a mailer, a camera operation application, and a music player application) from a memory 2006 or from another memory (not shown) and executes these programs, thereby providing various functions of the UE 12.

In some implementations, as represented by a dashed line (2005) in FIG. 20, the baseband processor 2003 and the application processor 2004 may be integrated on a single chip. In other words, the baseband processor 2003 and the application processor 2004 may be implemented in a single System on Chip (SoC) device 2005. An SoC device may be referred to as a system Large Scale Integration (LSI) or a chipset.

The memory 2006 is a volatile memory, a non-volatile memory, or a combination thereof. The memory 2006 may include a plurality of memory devices that are physically independent from each other. The volatile memory is, for example, an SRAM, a DRAM, or any combination thereof. The non-volatile memory is, for example, an MROM, an EEPROM, a flash memory, a hard disc drive, or any combination thereof. The memory 2006 may include, for example, an external memory device that can be accessed from the baseband processor 2003, the application processor 2004, and the SoC 2005. The memory 2006 may include an internal memory device that is integrated in the baseband processor 2003, the application processor 2004, or the SoC 2005. Further, the memory 2006 may include a memory in a Universal Integrated Circuit Card (UICC).

The memory 2006 may store one or more software modules (computer programs) 2007 including instructions and data to perform the processing by the UE 12 described in the above embodiments. In some implementations, the baseband processor 2003 or the application processor 2004 may load these software modules 2007 from the memory 2006 and execute the loaded software modules, thereby performing the processing of the UE 12 described in the above embodiments with reference to the drawings.

Note that, the control plane processes and operations described in the above embodiments can be achieved by the elements other than the RF transceiver 2001 and the antenna array 2202, i.e., achieved by the memory storing the software modules 2007 and at least one of the baseband processor 2003 and the application processor 2004.

As described above with reference to FIGS. 19 and 20, each of the processors included in the RAN node 11 and the UE 2 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

Each of the above-described embodiments may be used individually, or two or more embodiments may be appropriately combined with one another.

In the above embodiments, switching of the active BWP by DCI transmitted on a NR PDCCH is described. Note that, however, switching of the active BWP in the above-described embodiments may be done by a MAC CE or a timer (e.g., BWP Inactivity Timer).

The above embodiments are described mainly based on the assumption that only one BWP is activated for each UE (i.e. 1 active BWP per UE). However, the methods described in the above embodiments are also applicable to the case where multiple BWPs are simultaneously activated for a UE as a matter of course. For example, there are multiple active BWPs in a BWP set. Further, there are multiple active BWPs each corresponding to a respective one of multiple BWP groups configured in a BWP set, or there are multiple active BWPs in a BWP group.

The above embodiments may be applied also to MR-DC (e.g., EN-DC) and NR-NR DC. For example, in EN-DC, the MeNB, the SgNB and the UE may operate as follows. First, the UE transmits its NR capability (e.g., UE NR radio capability information) to the MeNB via RRC signaling (e.g., UE Capability Information message), and the MeNB forwards the NR capability to the SgNB. Further, the MeNB transmits to the UE, via an LTE RRC Connection Reconfiguration message, a request for transmitting an indication of need or no need of a measurement gap for each BWP in the SCG of NR (e.g., "PerBWP-GapIndicationRequest" IE). The SgNB may trigger the MeNB to transmit this request by using an X2 message. In response to receiving this request, the UE transmits an indication indicating need or no need of a per-BWP measurement gap (e.g., "perBWP-GapIndicationList" IE) to the MeNB via an LTE RRC Connection Reconfiguration Complete message. The MeNB forwards this indication (e.g., "perBWP-GapIndicationList" IE) received from the UE to the SgNB. Then, the SgNB sends a configuration of a per-BWP measurement gap (e.g., "measGapConfigPerBWP-List" IE) to the MeNB, and the MeNB transmits this configuration to the UE via an LTE RRC Connection Reconfiguration message. The information transmitted by the UE and the SgNB may be encoded by NR RRC.

Alternatively, in EN-DC, the MeNB, the SgNB and the UE may operate as follows. The SgNB may use a transparent RRC container to transmit a "PerBWP-GapIndicationRequest" and a "measGapConfigPerBWP-List" to the UE through the MeNB. To be specific, the SgNB includes an NR RRC Reconfiguration message containing a "PerBWP-GapIndicationRequest" in a transparent RRC container, and sends this transparent RRC container to the MeNB. The MeNB sends the transparent RRC container (which contains the "PerBWP-GapIndicationRequest") received from the SgNB to the UE via an LTE RRC Connection Reconfiguration message. The UE sends an NR RRC Reconfiguration Complete message, which contains a "perBWP-GapIndicationList", to the MeNB via an LTE RRC Connection Reconfiguration Complete message. The MeNB forwards to the SgNB the NR RRC Reconfiguration Complete message containing the "perBWP-GapIndicationList". After that, the SgNB includes a NR RRC Reconfiguration message containing a "measGapConfigPerBWP-List" in a transparent RRC container, and send this transparent RRC container to the MeNB. The MeNB sends the transparent RRC container (which contains the "measGapConfigPerBWP-List") received from the SgNB to the UE via an LTE RRC Connection Reconfiguration message. Note that, to achieve this, X2 messages (i.e., an SN MODIFICATION REQUIRED, an SN MODIFICATION REQUEST, an SN MODIFICATION REQUEST ACKNOWLEDGEMENT, and an SN MODIFICATION COMPLETE, respectively) in the SN (i.e. SgNB) Initiated SN Modification procedure may be used.

Further alternatively, in EN-DC, the SgNB and the UE may use a direct radio bearer between the SgNB and the UE established in the SCG to transmit a request for an indication of a per-BWP measurement gap, transmit an indication of need or no need of a per-BWP measurement gap, and transmit a per-BWP measurement gap configuration. This radio bearer may be a Signalling Radio Bearer 3 (SRB3). To be specific, the SgNB transmits a "PerBWP-GapIndicationRequest" to the UE via an NR RRC Reconfiguration message on the SRB3. The UE transmits a "perBWP-GapIndicationList" to the SgNB via an NR RRC Reconfiguration Complete message on the SRB3. The SgNB then transmits a "measGapConfigPerBWP-List" to the UE via an NR RRC Reconfiguration message on the SRB3.

Although the term "cell defining SSB" is used in the above embodiments, it may be referred to as a cell representative SSB because it is an SSB that is representative of a BWP corresponding to the cell from the UE perspective (i.e., physical cell) or of a BWP group corresponding to a set of the physical cells. Alternatively, the cell defining SSB may be referred to as a cell-specific SSB because it specifies a representative cell (physical cell) including this SSB. Further, the cell defining SSB may be referred to as a serving SSB because it is an SSB to be monitored when the UE camps on a BWP or BWP group including this SSB.

The sub-PCI described in the above embodiments may be associated with a BWP index.

The base BWP described in the above embodiments may be referred to as a default BWP, an initial BWP, a reference BWP, a primary BWP, an anchor BWP, or a master BWP. Specifically, the BWP on which the UE first camps when accessing the RAN node for the first time (i.e., when transitioning from Idle mode to Connected mode) may be referred to as a base BWP, a default BWP, an initial BWP, a reference BWP, a primary BWP, an anchor BWP, or a master BWP. In addition, or alternatively, a BWP which is not the base BWP among multiple BWPs included in one system bandwidth may be referred to as a sub-BWP, a secondary BWP, or a slave BWP.

Further, the above-described embodiments are merely examples of applications of the technical ideas obtained by the inventor. These technical ideas are not limited to the above-described embodiments and various modifications can be made thereto.

For example, the whole or part of the above embodiments can be described as, but not limited to, the following supplementary notes.

(Supplementary Note 1)

A radio terminal comprising:

a memory; and at least one processor coupled to the memory and configured to:

transmit, to a radio access network (RAN) node in a radio access network (RAN), an indication indicating whether a measurement gap for inter-bandwidth part (BWP) measurement among BWPs included in a plurality of downlink BWPs is required, the downlink BWPs being included within one system bandwidth; and receive, from the RAN node, a measurement configuration including a measurement gap configuration for one or more BWPs included in the downlink BWPs.

(Supplementary Note 2)

The radio terminal according to Supplementary note 1, wherein the indication indicates whether, when one of the downlink BWPs is activated for the radio terminal, the radio terminal needs a measurement gap for measurement of one or more BWPs different from the activated BWP.

(Supplementary Note 3)

The radio terminal according to Supplementary note 1, wherein the indication indicates, per BWP, whether the radio terminal needs a measurement gap for one or more BWPs that are included in the downlink BWPs but are different from a BWP activated for the radio terminal.

(Supplementary Note 4)

The radio terminal according to Supplementary note 1, wherein the indication includes information about a BWP combination indicating a combination of two or more BWPs included in the downlink BWPs, and the indication indicates whether, when one BWP of each BWP combination is activated for the radio terminal, the radio terminal needs a measurement gap for measurement of each remaining BWP of the BWP combination.

(Supplementary Note 5)

The radio terminal according to any one of Supplementary notes 1 to 4, wherein the at least one processor is configured to, in response to switching of an active BWP for communication between the radio terminal and the RAN among the downlink BWPs, use a measurement gap configuration corresponding to the active BWP in accordance with the measurement gap configuration.

(Supplementary Note 6)

The radio terminal according to any one of Supplementary notes 1 to 5, wherein the measurement gap configuration indicates a configuration regarding a measurement gap to be used by the radio terminal to measure one or more BWPs different from an activated BWP when one of the downlink BWPs is activated for the radio terminal.

(Supplementary Note 7)

The radio terminal according to Supplementary note 6, wherein the measurement gap configuration indicates at least one of: presence or absence of the measurement gap; a length of the measurement gap; and a pattern of the measurement gap.

(Supplementary Note 8)

The radio terminal according to any one of Supplementary notes 1 to 7, wherein the downlink BWPs are associated with one cell-defining signal block (SSB).

(Supplementary Note 9)

The radio terminal according to Supplementary note 8, wherein the measurement gap configuration includes a first measurement gap configuration and a second measurement gap configuration respectively for a first downlink BWP and a second downlink BWP included in the downlink BWPs, the at least one processor is configured to receive the first and second measurement gap configurations from the RAN node via Radio Resource Control (RRC) signaling, and the at least one processor is further configured to:

when the first downlink BWP is activated for communication with the RAN, use the first measurement gap configuration to measure another downlink BWP;

receive, from the RAN node, control information indicating switching of an active BWP from the first downlink BWP to the second downlink BWP without change of the cell-defining SSB, and in response to receiving the control information, switch the active BWP from the first downlink BWP to the second downlink BWP for communication with the RAN, and use the second measurement gap configuration instead of the first measurement gap configuration to measure another downlink BWP.

(Supplementary Note 10)

The radio terminal according to Supplementary note 9, wherein the control information is a non-RRC message.

(Supplementary Note 11)

A radio access network (RAN) node placed in a radio access network (RAN), the RAN node comprising:

a memory; and at least one processor coupled to the memory and configured to:

receive, from a radio terminal, an indication indicating whether a measurement gap for inter-bandwidth part (BWP) measurement among BWPs included in a plurality of downlink BWPs is required, the downlink BWPs being included within one system bandwidth; and transmit, to the radio terminal, a measurement configuration including a measurement gap configuration for one or more BWPs included in the downlink BWPs.

(Supplementary Note 12)

The RAN node according to Supplementary note 11, wherein the indication indicates whether, when one of the downlink BWPs is activated for the radio terminal, the radio terminal needs a measurement gap for measurement of one or more BWPs different from the activated BWP.

(Supplementary Note 13)

The RAN node according to Supplementary note 11, wherein the indication indicates, per BWP, whether the radio terminal needs a measurement gap for one or more BWPs that are included in the downlink BWPs but are different from a BWP activated for the radio terminal.

(Supplementary Note 14)

The RAN node according to Supplementary note 11, wherein the indication includes information about a BWP combination indicating a combination of two or more BWPs included in the downlink BWPs, and the indication indicates whether, when one BWP of each BWP combination is activated for the radio terminal, the radio terminal needs a measurement gap for measurement of each remaining BWP of the BWP combination.

(Supplementary Note 15)

The RAN node according to any one of Supplementary notes 11 to 14, wherein the measurement gap configuration indicates a configuration regarding a measurement gap to be used by the radio terminal to measure one or more BWPs different from an activated BWP when one of the downlink BWPs is activated for the radio terminal.

(Supplementary Note 16)

The RAN node according to Supplementary note 15, wherein the measurement gap configuration indicates at least one of: presence or absence of the measurement gap; a length of the measurement gap; and a pattern of the measurement gap.

(Supplementary Note 17)

The RAN node according to any one of Supplementary notes 11 to 16, wherein the downlink BWPs are associated with one cell-defining synchronization signal block (SSB).

(Supplementary Note 18)

The RAN node according to Supplementary note 17, wherein the measurement gap configuration includes a first measurement gap configuration and a second measurement gap configuration respectively for a first downlink BWP and a second downlink BWP included in the downlink BWPs, the at least one processor is configured to transmit the first and second measurement gap configurations to the radio terminal via Radio Resource Control (RRC) signaling, the at least one processor is further configured to:

when the first downlink BWP is activated for communication with the RAN, communicate with the radio terminal while taking into account that the first measurement gap configuration is used by the radio terminal to measure another downlink BWP, and transmit, to the radio terminal, control information indicating switching of an active BWP from the first downlink BWP to the second downlink BWP without change of the cell-defining SSB, wherein the control information triggers the radio terminal to switch the active BWP from the first downlink BWP to the second downlink BWP for communication with the RAN, and triggers the radio terminal to use the second measurement gap configuration instead of the first measurement gap configuration to measure another downlink BWP.

(Supplementary Note 19)

The RAN node according to Supplementary note 18, wherein the control information is a non-RRC message.

(Supplementary Note 20)

A method for a radio terminal, the method comprising:

transmitting, to a radio access network (RAN) node in a radio access network (RAN), an indication indicating whether a measurement gap for inter-bandwidth part (BWP) measurement among BWPs included in a plurality of downlink BWPs is required, the downlink BWPs being included within one system bandwidth; and receiving, from the RAN node, a measurement configuration including a measurement gap configuration for one or more BWPs included in the downlink BWPs.

(Supplementary Note 21)

A method for a radio access network (RAN) node placed in a radio access network (RAN), the method comprising:

receiving, from a radio terminal, an indication indicating whether a measurement gap for inter-bandwidth part (BWP) measurement among BWPs included in a plurality of downlink BWPs is required, the downlink BWPs being included within one system bandwidth; and transmitting, to the radio terminal, a measurement configuration including a measurement gap configuration for one or more BWPs included in the downlink BWPs.

(Supplementary Note 22)

A program for causing a computer to perform a method for a radio terminal, wherein the method comprises:

transmitting, to a radio access network (RAN) node in a radio access network (RAN), an indication indicating whether a measurement gap for inter-bandwidth part (BWP) measurement among BWPs included in a plurality of downlink BWPs is required, the downlink BWPs being included within one system bandwidth; and receiving, from the RAN node, a measurement configuration including a measurement gap configuration for one or more BWPs included in the downlink BWPs.

(Supplementary Note 23)

A program for causing a computer to perform a method for a radio access network (RAN) node placed in a radio access network (RAN), wherein the method comprises:

receiving, from a radio terminal, an indication indicating whether a measurement gap for inter-bandwidth part (BWP) measurement among BWPs included in a plurality of downlink BWPs is required, the downlink BWPs being included within one system bandwidth; and transmitting, to the radio terminal, a measurement configuration including a measurement gap configuration for one or more BWPs included in the downlink BWPs.

(Supplementary Note 24)

A radio terminal comprising:

a memory; and at least one processor coupled to the memory and configured to:

receive from a radio access network (RAN) node in a radio access network (RAN), via Radio Resource Control (RRC) signaling, a first measurement configuration and a second measurement configuration respectively for a first downlink bandwidth part (BWP) and a second downlink BWP, the first and second downlink BWPs being included in one system bandwidth and being associated with one cell-defining synchronization signal block (SSB);

use the first measurement configuration when the first downlink BWP is activated for communication with the RAN;

receive, from the RAN node, control information indicating switching of an active BWP from the first downlink BWP to the second downlink BWP without change of the cell-defining SSB; and in response to receiving the control information, switch the active BWP from the first downlink BWP to the second downlink BWP for communication with the RAN, and use the second measurement configuration instead of the first measurement configuration.

(Supplementary Note 25)

The radio terminal according to Supplementary note 24, wherein the control information is a non-RRC message.

(Supplementary Note 26)

The radio terminal according to Supplementary note 24 or 25, wherein each of the first and second measurement configurations includes a measurement gap configuration.

(Supplementary Note 27)

A radio access network (RAN) node comprising:

a memory; and at least one processor coupled to the memory and configured to:

transmit to a radio terminal, via Radio Resource Control (RRC) signaling, a first measurement configuration and a second measurement configuration respectively for a first downlink bandwidth part (BWP) and a second downlink BWP, the first and second downlink BWPs being included in one system bandwidth and being associated with one cell-defining synchronization signal block (SSB);

when the first downlink BWP is activated for communication with a radio access network (RAN), communicate with the radio terminal while taking into account that the first measurement configuration is used by the radio terminal; and transmit, to the radio terminal, control information indicating switching of an active BWP from the first downlink BWP to the second downlink BWP without change of the cell-defining SSB, wherein the control information triggers the radio terminal to switch the active BWP from the first downlink BWP to the second downlink BWP for communication with the RAN, and triggers the radio terminal to use the second measurement configuration instead of the first measurement configuration.

(Supplementary Note 28)

The RAN node according to Supplementary note 27, wherein the control information is a non-RRC message.

(Supplementary Note 29)

The RAN node according to Supplementary note 27 or 28, wherein each of the first and second measurement configurations includes a measurement gap configuration.

(Supplementary Note 30)

A method for a radio terminal, the method comprising:

receiving from a radio access network (RAN) node in a radio access network (RAN), via Radio Resource Control (RRC) signaling, a first measurement configuration and a second measurement configuration respectively for a first downlink bandwidth part (BWP) and a second downlink BWP, the first and second downlink BWPs being included in one system bandwidth and being associated with one cell-defining synchronization signal block (SSB);

using the first measurement configuration when the first downlink BWP is activated for communication with the RAN;

receiving, from the RAN node, control information indicating switching of an active BWP from the first downlink BWP to the second downlink BWP without change of the cell-defining SSB; and in response to receiving the control information, switching the active BWP from the first downlink BWP to the second downlink BWP for communication with the RAN, and using the second measurement configuration instead of the first measurement configuration.

(Supplementary Note 31)

A method for a radio access network (RAN) node, the method comprising:

transmitting to a radio terminal, via Radio Resource Control (RRC) signaling, a first measurement configuration and a second measurement configuration respectively for a first downlink bandwidth part (BWP) and a second downlink BWP, the first and second downlink BWPs being included in one system bandwidth and being associated with one cell-defining synchronization signal block (SSB);

when the first downlink BWP is activated for communication with a radio access network (RAN), communicating with the radio terminal while taking into account that the first measurement configuration is used by the radio terminal; and transmitting, to the radio terminal, control information indicating switching of an active BWP from the first downlink BWP to the second downlink BWP without change of the cell-defining SSB, wherein the control information triggers the radio terminal to switch the active BWP from the first downlink BWP to the second downlink BWP for communication with the RAN, and triggers the radio terminal to use the second measurement configuration instead of the first measurement configuration.

(Supplementary Note 32)

A program for causing a computer to perform a method for a radio terminal, wherein the method comprises:

receiving from a radio access network (RAN) node in a radio access network (RAN), via Radio Resource Control (RRC) signaling, a first measurement configuration and a second measurement configuration respectively for a first downlink bandwidth part (BWP) and a second downlink BWP, the first and second downlink BWPs being included in one system bandwidth and being associated with one cell-defining synchronization signal block (SSB);

using the first measurement configuration when the first downlink BWP is activated for communication with the RAN;

receiving, from the RAN node, control information indicating switching of an active BWP from the first downlink BWP to the second downlink BWP without change of the cell-defining SSB; and in response to receiving the control information, switching the active BWP from the first downlink BWP to the second downlink BWP for communication with the RAN, and using the second measurement configuration instead of the first measurement configuration.

(Supplementary Note 33)

A non-transitory computer readable medium storing a program for causing a computer to perform a method for a radio access network (RAN) node, wherein the method comprises:

transmitting to a radio terminal, via Radio Resource Control (RRC) signaling, a first measurement configuration and a second measurement configuration respectively for a first downlink bandwidth part (BWP) and a second downlink BWP, the first and second downlink BWPs being included in one system bandwidth and being associated with one cell-defining synchronization signal block (SSB);

when the first downlink BWP is activated for communication with a radio access network (RAN), communicating with the radio terminal while taking into account that the first measurement configuration is used by the radio terminal; and transmitting, to the radio terminal, control information indicating switching of an active BWP from the first downlink BWP to the second downlink BWP without change of the cell-defining SSB, wherein the control information triggers the radio terminal to switch the active BWP from the first downlink BWP to the second downlink BWP for communication with the RAN, and triggers the radio terminal to use the second measurement configuration instead of the first measurement configuration.

(Supplementary Note 34)

A radio terminal comprising:

a memory; and at least one processor coupled to the memory and configured to:

receive, from a radio access network (RAN) node in a radio access network (RAN), via Radio Resource Control (RRC) signaling, a measurement configuration for a first downlink bandwidth part (BWP) and a second downlink BWP, the first and second downlink BWPs being included in one system bandwidth and being associated with one cell-defining synchronization signal block (SSB);

use the measurement configuration when the first downlink BWP is activated for communication with the RAN;

receive, from the RAN node, control information indicating switching of an active BWP from the first downlink BWP to the second downlink BWP without change of the cell-defining SSB; and in response to receiving the control information, switch the active BWP from the first downlink BWP to the second downlink BWP for communication with the RAN, and use the measurement configuration by replacing a relationship between a serving cell and a neighbor cell in the measurement configuration.

(Supplementary Note 35)

The radio terminal according to Supplementary note 34, wherein the control information is a non-RRC message.

(Supplementary Note 36)

A method for a radio terminal, the method comprising:

receiving, from a radio access network (RAN) node in a radio access network (RAN), via Radio Resource Control (RRC) signaling, a measurement configuration for a first downlink bandwidth part (BWP) and a second downlink BWP, the first and second downlink BWPs being included in one system bandwidth and being associated with one cell-defining synchronization signal block (SSB);

using the measurement configuration when the first downlink BWP is activated for communication with the RAN;

receiving, from the RAN node, control information indicating switching of an active BWP from the first downlink BWP to the second downlink BWP without change of the cell-defining SSB; and in response to receiving the control information, switching the active BWP for communication with the RAN from the first downlink BWP to the second downlink BWP, and using the measurement configuration by replacing a relationship between a serving cell and a neighbor cell in the measurement configuration.

(Supplementary Note 37)

A program for causing a computer to perform a method for a radio terminal, wherein the method comprises:

receiving, from a radio access network (RAN) node in a radio access network (RAN), via Radio Resource Control (RRC) signaling, a measurement configuration for a first downlink bandwidth part (BWP) and a second downlink BWP, the first and second downlink BWPs being included in one system bandwidth and being associated with one cell-defining synchronization signal block (SSB);

using the measurement configuration when the first downlink BWP is activated for communication with the RAN;

receiving, from the RAN node, control information indicating switching of an active BWP from the first downlink BWP to the second downlink BWP without change of the cell-defining SSB; and in response to receiving the control information, switching the active BWP for communication with the RAN from the first downlink BWP to the second downlink BWP, and using the measurement configuration by replacing a relationship between a serving cell and a neighbor cell in the measurement configuration.

This application is based upon and claims the benefit of priority from Japanese Patent Application No. 2017-218039, filed on Nov. 13, 2017, the disclosure of which is incorporated herein in its entirety by reference.

REFERENCE SIGNS LIST

11 RAN NODE
12 UE
1904 PROCESSOR
1905 MEMORY
2003 BASEBAND PROCESSOR
2004 APPLICATION PROCESSOR

The invention claimed is:

1. A method for a User Equipment (UE), the method comprising:

receiving a Radio Resource Control (RRC) Reconfiguration message from a communication apparatus, wherein the RRC Reconfiguration message includes first information indicating a first measurement gap for a first bandwidth part and second information indicating a second measurement gap for a second bandwidth part, and wherein the first bandwidth part and the second bandwidth part included in configured bandwidth parts for the UE are related to a Cell Defining Synchronization Signal/Physical Broadcast Channel block (SSB);

using the first measurement gap based on the first bandwidth part being an active bandwidth part;

receiving control information to switch the active bandwidth part from the first bandwidth part to the second bandwidth part;

switching the active bandwidth part from the first bandwidth part to the second bandwidth part and using the second measurement gap based on the control information; and transmitting an RRC Reconfiguration Complete message to the communication apparatus, wherein the RRC Reconfiguration Complete message includes information indicating whether a third measurement gap for the configured bandwidth part is required.

2. The method according to claim 1, wherein the first measurement gap is different from the second measurement gap.

3. The method according to claim 1, wherein either the first or the second bandwidth part is an initial bandwidth part.

4. The method according to claim 1, wherein the communication apparatus is a base station or gNB.

5. A method for a communication apparatus, the method comprising:

sending a Radio Resource Control (RRC) Reconfiguration message to a User Equipment (UE), wherein the RRC Reconfiguration message includes first information indicating a first measurement gap for a first bandwidth part and second information indicating a second measurement gap for a second bandwidth part, wherein the first bandwidth part and the second bandwidth part included in configured bandwidth parts for the UE are related to a Cell Defining Synchronization Signal/Physical Broadcast Channel block (SSB), and wherein the first measurement gap is used based on the first bandwidth part being an active bandwidth part;

sending control information for switching the active bandwidth part from the first bandwidth part to the second bandwidth part and for switching a measurement gap from the first measurement gap to the second measurement gap; and receiving an RRC Reconfiguration Complete message from the UE, wherein the RRC Reconfiguration Complete message includes information indicating whether a third measurement gap for the configured bandwidth part is required.

6. The method according to claim 5, wherein the first measurement gap is different from the second measurement gap.

7. The method according to claim 5, wherein either the first or the second bandwidth part is an initial bandwidth part.

8. The method according to claim 5, the method further comprising:

communicating with the UE taking into account that the first measurement gap is used by the UE based on the first bandwidth part being the active bandwidth part; and communicating with the UE taking into account that the second measurement gap is used by the UE based on the second bandwidth part being the active bandwidth part.

9. The method according to claim 5, wherein the communication apparatus is a base station or gNB.

10. A User Equipment (UE) comprising:

at least one memory; and at least one hardware processor coupled to the at least one memory and configured to:

receive a Radio Resource Control (RRC) Reconfiguration message from a communication apparatus, wherein the RRC Reconfiguration message includes first information indicating a first measurement gap for a first bandwidth part and second information indicating a second measurement gap for a second bandwidth part, and wherein the first bandwidth part and the second bandwidth part included in configured bandwidth parts for the UE are related to a Cell Defining Synchronization Signal/Physical Broadcast Channel block (SSB);

use the first measurement gap based on the first bandwidth part being an active bandwidth part;

receive control information to switch the active bandwidth part from the first bandwidth part to the second bandwidth part;

switch the active bandwidth part from the first bandwidth part to the second bandwidth part and use the second measurement gap based on the control information; and transmit an RRC Reconfiguration Complete message to the communication apparatus, wherein the RRC Reconfiguration Complete message includes information indicating whether a third measurement gap for the configured bandwidth part is required.

11. A communication apparatus comprising:

at least one memory; and at least one hardware processor coupled to the at least one memory and configured to:

send a Radio Resource Control (RRC) Reconfiguration message to a User Equipment (UE), wherein the RRC Reconfiguration message includes first information indicating a first measurement gap for a first bandwidth part and second information indicating a second measurement gap for a second bandwidth part, wherein the first bandwidth part and the second bandwidth part included in configured bandwidth parts for the UE are related to a Cell Defining Synchronization Signal/Physical Broadcast Channel block (SSB), and wherein the first measurement gap is used based on the first bandwidth part being an active bandwidth part;

send control information for switching the active bandwidth part from the first bandwidth part to the second bandwidth part and for switching a measurement gap from the first measurement gap to the second measurement gap; and receive an RRC Reconfiguration Complete message from the UE, wherein the RRC Reconfiguration Complete message includes information indicating whether a third measurement gap for the configured bandwidth part is required.

* * * * *